United States Patent
Davison et al.

(10) Patent No.: US 10,733,917 B2
(45) Date of Patent: Aug. 4, 2020

(54) MAGNETIC FASTENER SYSTEMS AND METHODS

(71) Applicant: The Boeing Company, Chicago, IL (US)

(72) Inventors: Carl A. Davison, Snohomish, WA (US); Zachary A. Connaughton, Shoreline, WA (US); Nikolas R. Campanello, Monroe, WA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 16/168,786

(22) Filed: Oct. 23, 2018

(65) Prior Publication Data

US 2020/0126456 A1 Apr. 23, 2020

(51) Int. Cl.
| | |
|---|---|
| *G09F 7/04* | (2006.01) |
| *F16B 1/00* | (2006.01) |
| *H01F 7/02* | (2006.01) |
| *G09F 7/18* | (2006.01) |

(52) U.S. Cl.
CPC .............. *G09F 7/04* (2013.01); *F16B 1/00* (2013.01); *G09F 7/18* (2013.01); *H01F 7/0263* (2013.01); *F16B 2001/0035* (2013.01); *G09F 2007/1852* (2013.01)

(58) Field of Classification Search
CPC ...... G09F 7/04; G09F 7/18; G09F 2007/1852; H01F 7/0263; H01F 7/02; H01F 7/04; F16B 2001/0035; F16B 1/00
See application file for complete search history.

(56) References Cited

U.S. PATENT DOCUMENTS

| | | | | |
|---|---|---|---|---|
| 2,963,167 | A * | 12/1960 | Norman | B43M 99/001 211/74 |
| 5,641,105 | A * | 6/1997 | Goto | B60R 9/04 224/309 |
| 6,042,080 | A * | 3/2000 | Shepherd | B60R 11/00 248/163.1 |
| 8,287,034 | B2 * | 10/2012 | Smith | B60R 13/0206 24/303 |

(Continued)

OTHER PUBLICATIONS

"Custom Horse Jump Cups" sold by Jump Rails and More, Inc. at http://jumprailsandmore.com/access_cups.php, at least before Oct. 23, 2018 (9 pages).

*Primary Examiner* — Anita M King
(74) *Attorney, Agent, or Firm* — McDonnell Boehnen Hulbert & Berghoff LLP

(57) ABSTRACT

In an example, a system includes a bracket and a fastener. The bracket includes a distal bracket portion defining an aperture. The aperture includes a first aperture section of a first width and a second aperture section of a second width. The second width is less than the first width. The bracket includes a proximal bracket portion extending from the distal bracket portion, a cavity defined by the distal bracket portion and the proximal bracket portion, and a magnet in the cavity and coupled to the proximal bracket portion. The fastener includes a stem extending from a first end to a second end. The first end is configured to couple to an object. The fastener includes a ferromagnetic retainer at the second end of the stem. The ferromagnetic retainer has a third width that is less than the first width and greater than the second width.

20 Claims, 17 Drawing Sheets

(56) References Cited

U.S. PATENT DOCUMENTS

| | | | | |
|---|---|---|---|---|
| 9,249,814 B2* | 2/2016 | Tsai | ........................ | A44B 15/00 |
| 2002/0166275 A1* | 11/2002 | Broadwell | ................ | G09F 3/20 |
| | | | | 40/607.1 |
| 2007/0099469 A1* | 5/2007 | Sorensen | .................. | A45F 5/02 |
| | | | | 439/289 |
| 2015/0033604 A1* | 2/2015 | Bigham | .................. | G09F 17/00 |
| | | | | 40/591 |
| 2019/0271343 A1* | 9/2019 | Perez Hernandez | ... | F16B 5/123 |

* cited by examiner

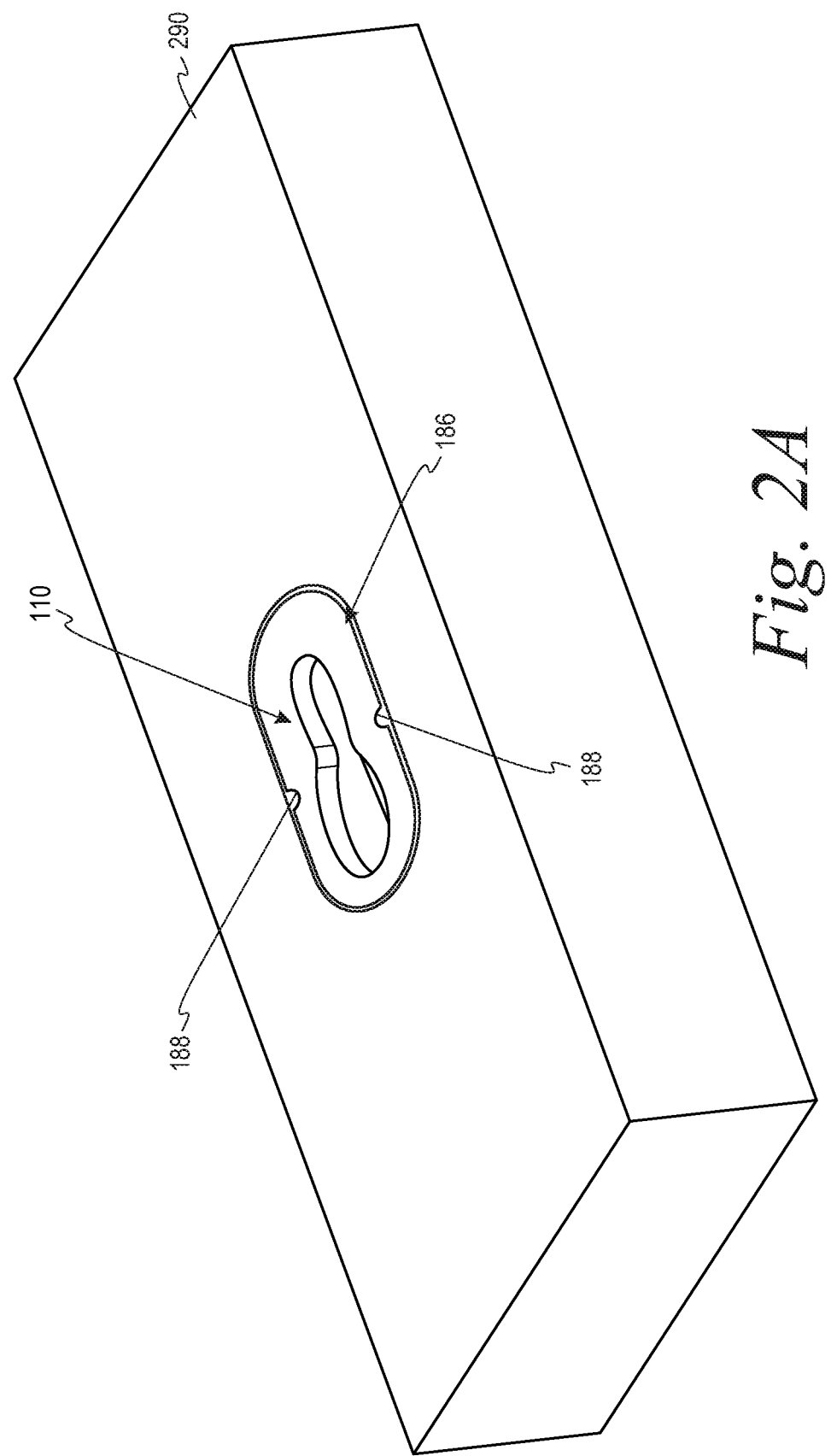

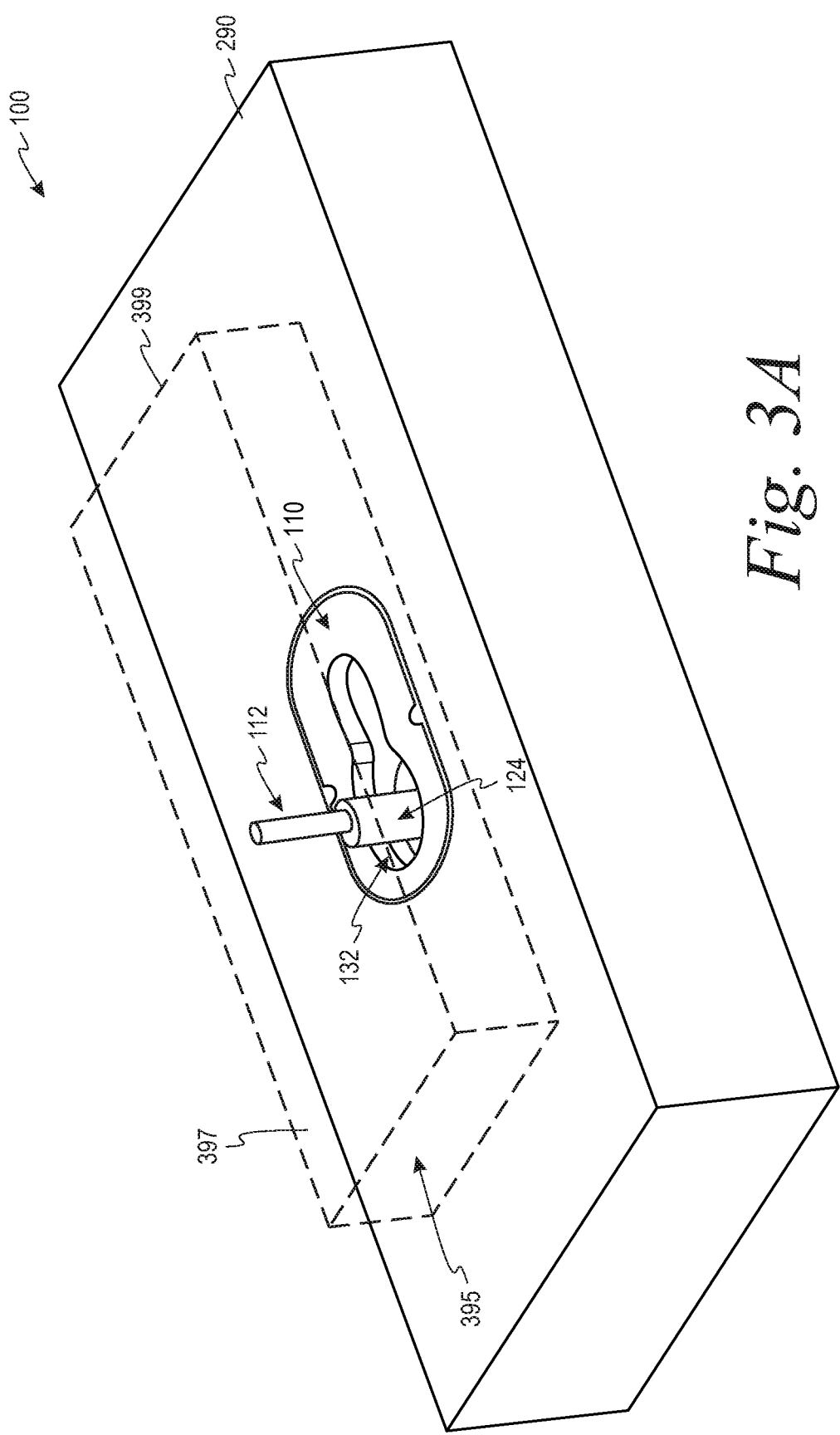

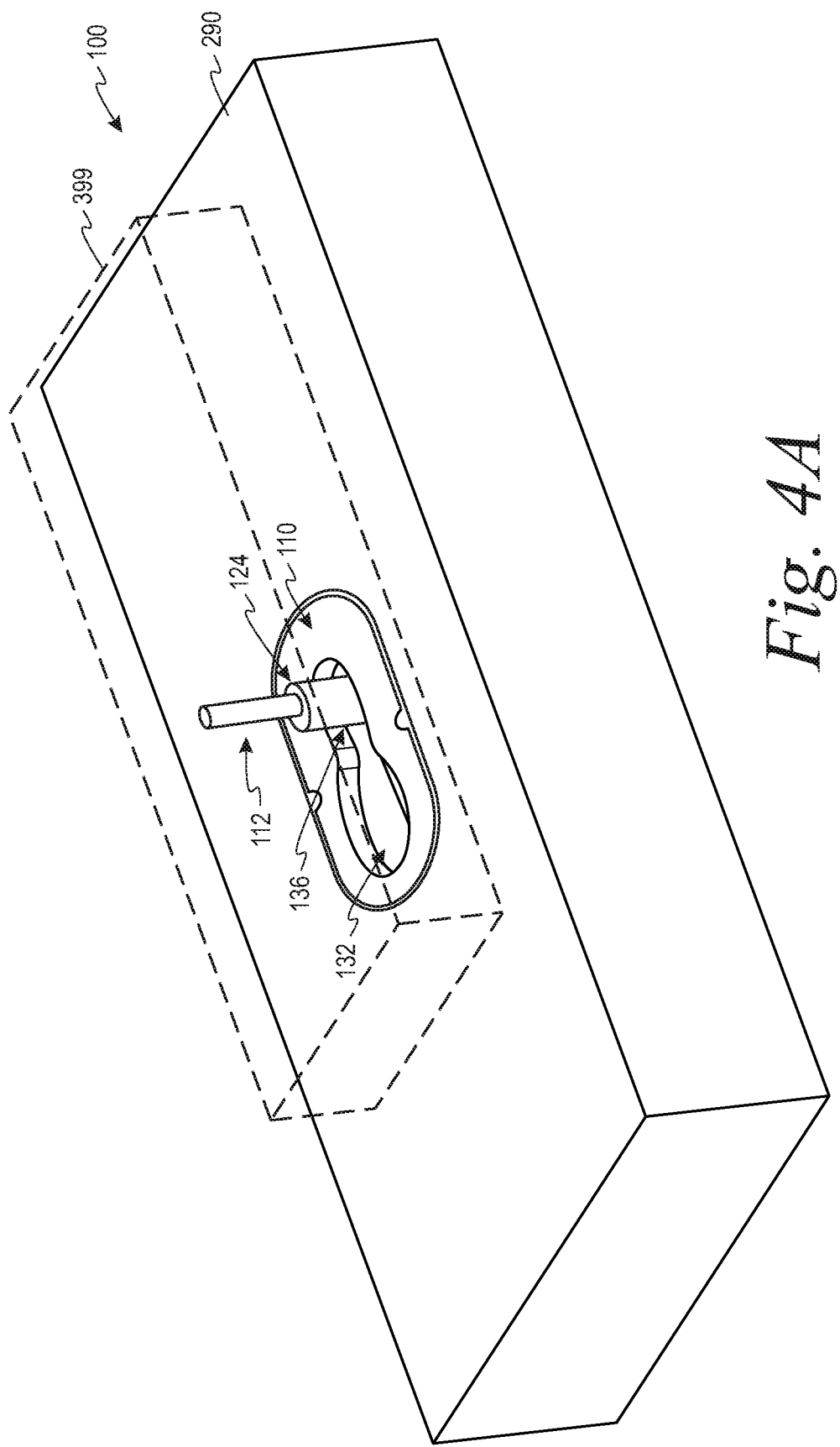

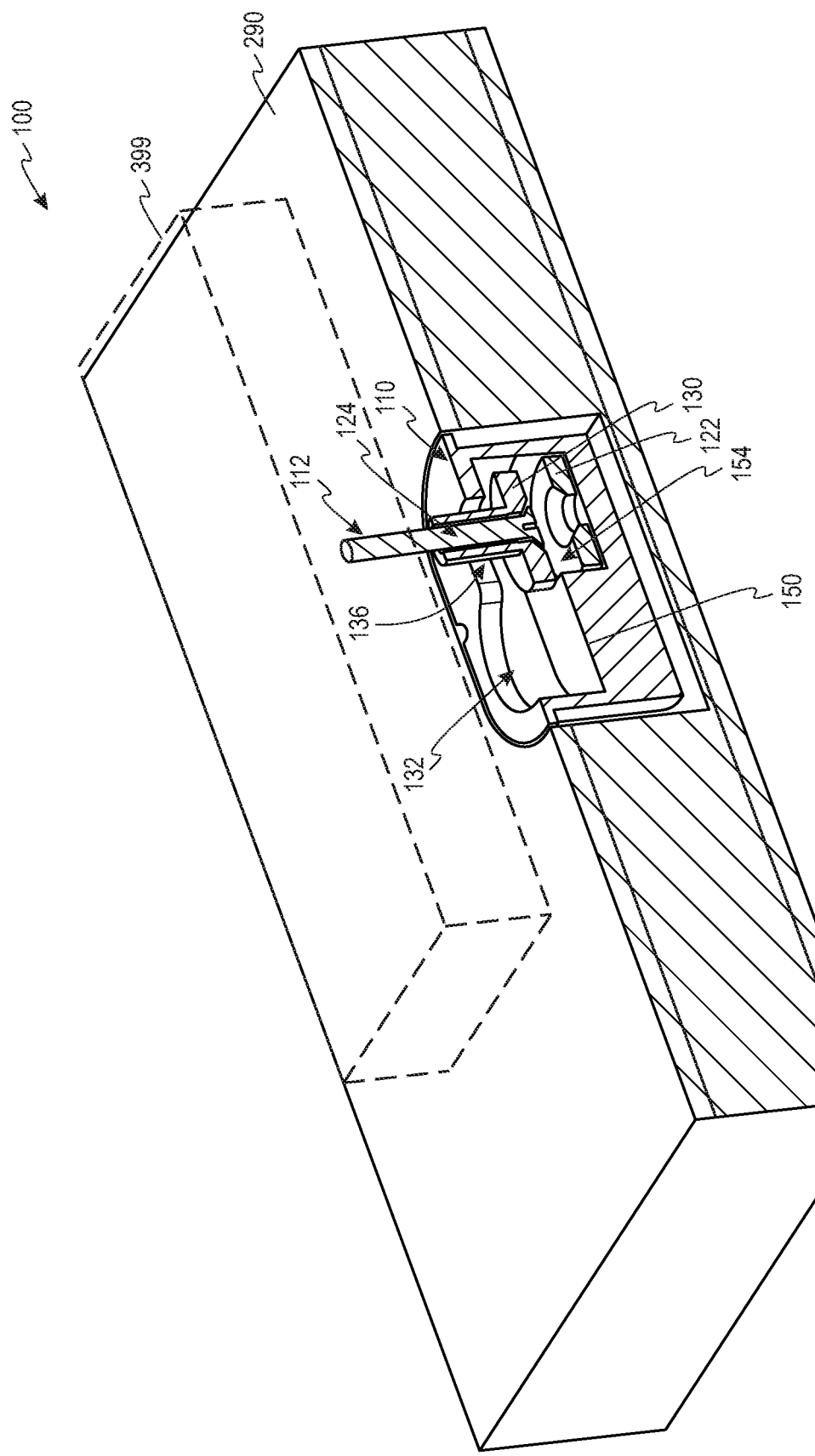

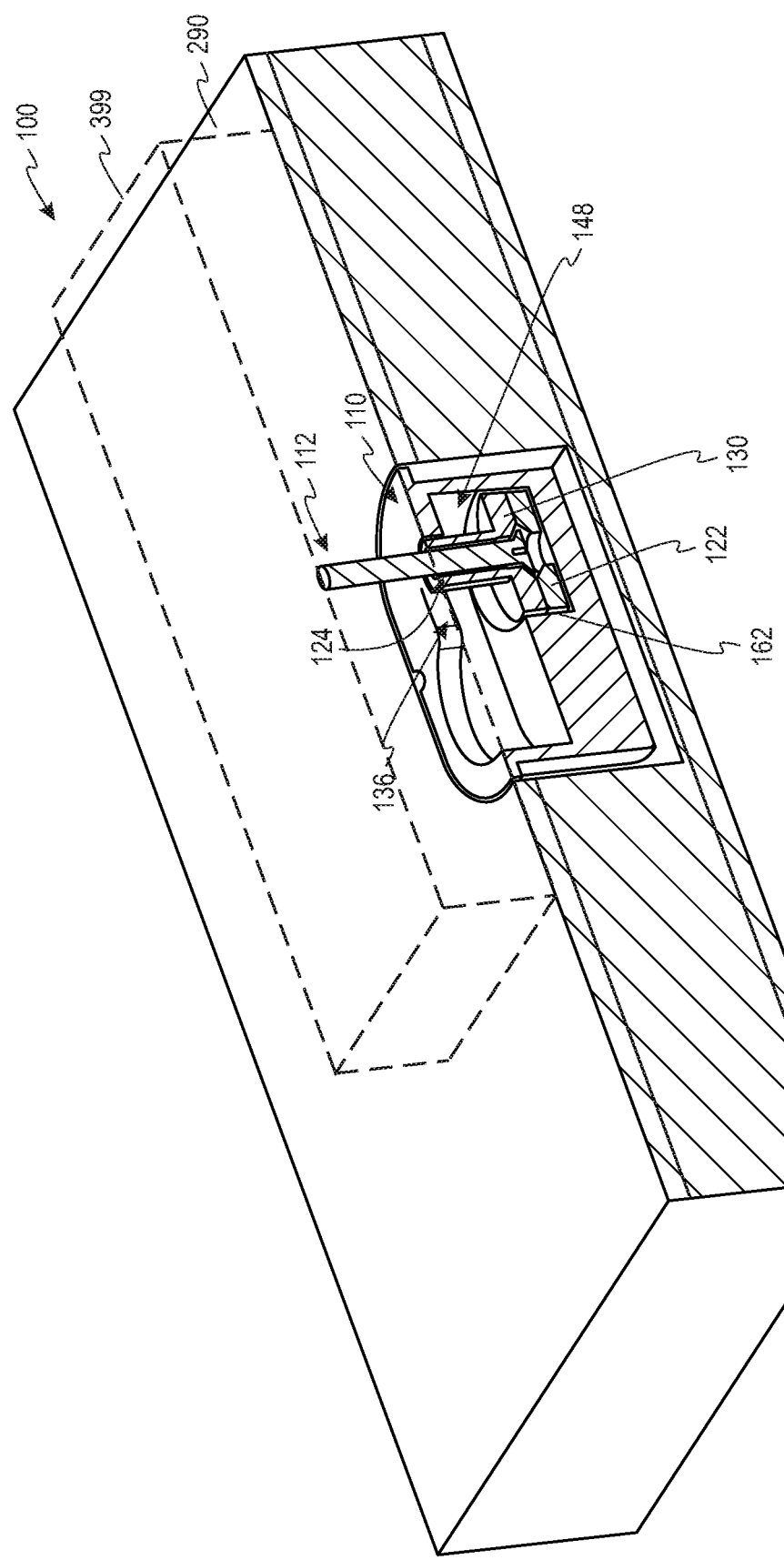

MAGNETIC FASTENER SYSTEMS AND METHODS

FIELD

The present disclosure generally relates to systems and methods for fasteners, and more particularly to a systems and methods for magnetically coupling a fastener and a bracket.

BACKGROUND

Signage panels and/or decorative panels can be used to display information and/or enhance an aesthetic in an environment. Typically, the signage panels and/or the decorative panels are secured to a structure by fasteners that extend entirely through the signage panel and/or the decorative panel. In general, because the fastener extends entirely through the signage panel and/or the decorative panel, the fastener is exposed on a visible side of the signage panel and/or the decorative panel.

SUMMARY

In an example, a system is described. The system includes a bracket and a fastener. The bracket includes a distal bracket portion defining an aperture. The aperture includes a first aperture section of a first width and a second aperture section of a second width. The second width is less than the first width. The bracket also includes a proximal bracket portion extending from the distal bracket portion, a cavity defined by the distal bracket portion and the proximal bracket portion, and a magnet in the cavity and coupled to the proximal bracket portion. The fastener includes a stem extending from a first end to a second end. The first end is configured to couple to an object. The fastener also includes a ferromagnetic retainer at the second end of the stem. The ferromagnetic retainer has a third width that is less than the first width of the first aperture section and greater than the second width of the second aperture section.

The bracket and fastener are configured such that: (i) the ferromagnetic retainer is insertable into the cavity through the first aperture section, (ii) while the ferromagnetic retainer is in the cavity, the stem is movable along a length of the bracket from a first position in the first aperture section to a second position in the second aperture section, and (iii) when the stem is at the second position in the second aperture section, the ferromagnetic retainer magnetically couples to the magnet in the cavity.

In another example, a bracket is described. The bracket includes a distal bracket portion defining an aperture. The aperture includes a first aperture section of a first width and a second aperture section of a second width. The second width is less than the first width. The bracket also includes a proximal bracket portion extending from the distal bracket portion, and a cavity defined by the distal bracket portion and the proximal bracket portion. The cavity includes a first cavity portion extending from the first aperture section to a shelf of the proximal bracket portion, and a second cavity portion extending from the second aperture section to a proximal surface of a pocket that is recessed relative to the shelf. The bracket further includes a magnet in the pocket and coupled to the proximal bracket portion. The bracket is configured to receive a ferromagnetic retainer of a fastener in the first cavity portion. The magnet is configured to apply a magnetic force to move the ferromagnetic retainer in a direction from the first cavity portion to the second cavity portion, and magnetically couple to the ferromagnetic retainer.

In another example, a method of coupling an object to a bracket is described. The bracket includes a distal bracket portion and a proximal bracket portion. The distal bracket portion includes an aperture. The distal bracket portion and the proximal bracket portion define a cavity proximal to the aperture.

The method includes inserting, through a first aperture section of the aperture, a fastener to a first position in the cavity of the bracket. The fastener includes a stem extending from a first end to a second end. The first end is coupled to the object. The fastener includes a ferromagnetic retainer at the second end of the stem, and the ferromagnetic retainer is in the cavity when the fastener is at the first position. The method also includes, after inserting the fastener to the first position, translating the fastener from (i) the first position in which the stem extends through the first aperture section to (ii) a second position in which the stem extends through a second aperture section of the aperture. The method further includes, responsive to translating the fastener from the first position to the second position, magnetically coupling the ferromagnetic retainer to a magnet in the cavity of the bracket.

The first aperture section has a first width, the second aperture section has a second width, and the ferromagnetic retainer has a third width. The third width of the ferromagnetic retainer is less than the first width of the first aperture section to allow for inserting the fastener through the first aperture section to the first position. The third width of the ferromagnetic retainer is greater than the second width of the second aperture section to inhibit withdrawing the fastener through the second aperture section when the fastener is at the second position.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 2A illustrates a perspective view of the system at a first stage of a process for coupling an object to a structure, according to an example.

FIG. 3A illustrates a perspective view of the system at a second stage of the process for coupling the object to the structure, according to an example.

FIG. 4A illustrates a perspective view of the system at a third stage of the process for coupling the object to the structure, according to an example.

FIG. 4B illustrates a cross-sectional view of the system at the third stage of the process for coupling the object to the structure, according to an example.

FIG. 5B illustrates a cross-sectional view of the system at the fourth stage of the process for coupling the object to the structure, according to an example.

DETAILED DESCRIPTION

Figure 1A:
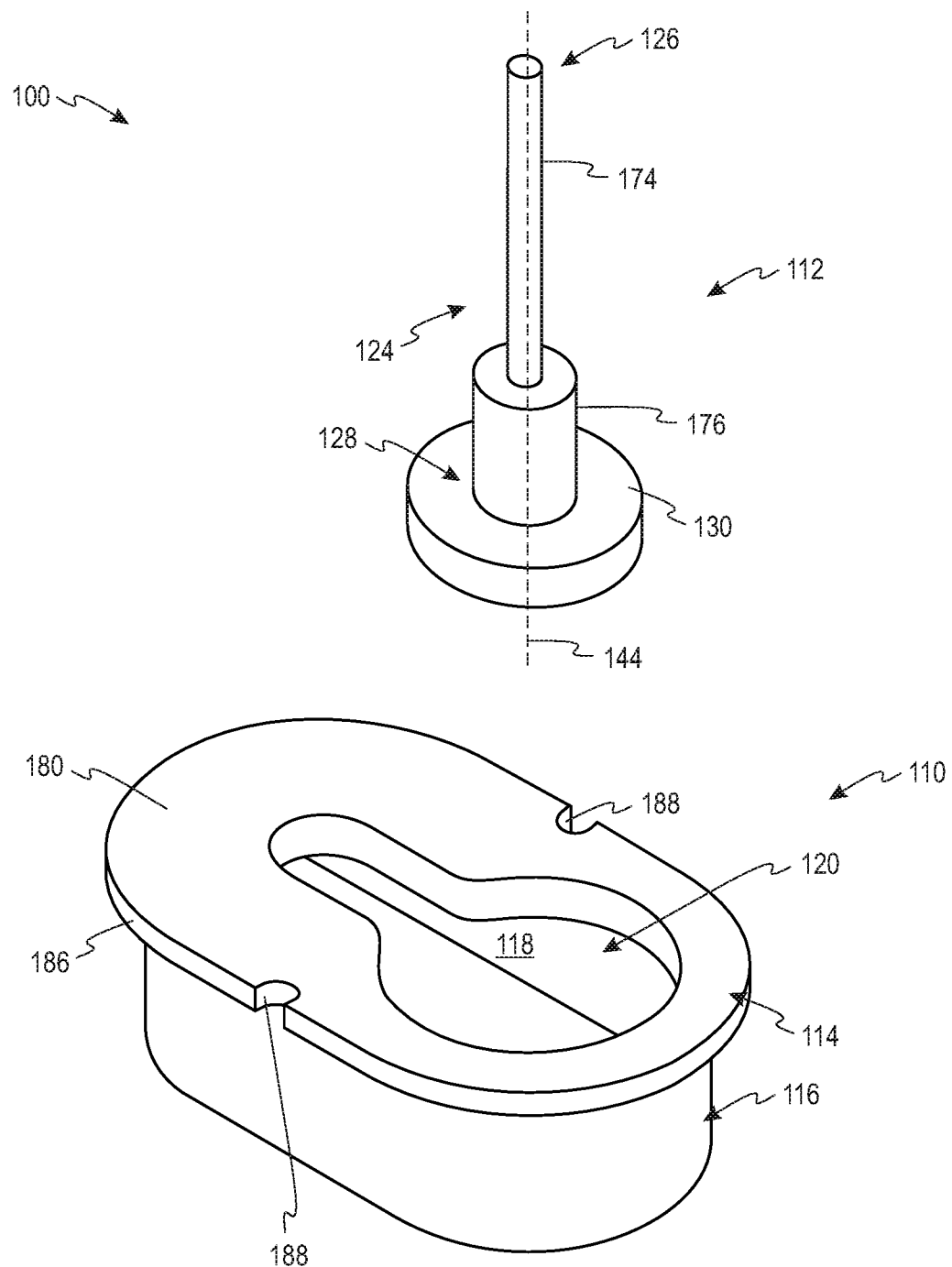
FIG. 1A illustrates a perspective view of a system in a decoupled state, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As noted above, the signage panels and/or the decorative panels are typically secured to a structure by fasteners that extend entirely through the signage panel and/or the decorative panel. In general, because the fastener extends entirely through the signage panel and/or the decorative panel, the fastener is exposed on a visible side of the signage panel and/or the decorative panel. This can reduce the aesthetic appeal of the signage panel and/or the decorative panel. Additionally, a process for installing the signage panel and/or the decorative panel on the structure may be cumbersome as an operator may need to hold the signage panel and/or decorative panel in position while aligning and threading the screw.

Example systems and methods described herein can beneficially address at least some drawbacks of existing approaches to coupling object (such as, e.g., a signage panel and/or a decorative panel) to a structure. Within examples, a system includes a bracket and a fastener. The bracket includes a distal bracket portion defining an aperture that provides access to a cavity in the bracket. The bracket also includes a magnet in the cavity and coupled to a proximal bracket portion of the bracket.

The fastener includes a stem extending between a first end and a second end. Within examples, the first end of the stem can couple to an interior portion of the object such that the fastener is not visible on one side of the object. The second end includes a ferromagnetic retainer, which is configured to magnetically couple to the magnet of the bracket.

The aperture of the bracket includes a first aperture section that has a width that is greater than a width of the ferromagnetic retainer of the fastener, and a second aperture section that has a width that is less than the width of the ferromagnetic retainer of the fastener. In this arrangement, the bracket and fastener are configured such that: (i) the ferromagnetic retainer is insertable into the cavity through the first aperture section, (ii) while the ferromagnetic retainer is in the cavity, the stem is movable along a length of the bracket from a first position in the first aperture section to a second position in the second aperture section, and (iii) when the stem is at the second position in the second aperture section, the ferromagnetic retainer magnetically couples to the magnet in the cavity. In some examples, the magnet in the bracket can apply a magnetic force on the ferromagnetic retainer that assists in moving the fastener within the bracket to the position at which the ferromagnetic retainer of the fastener magnetically couples to the magnet of the bracket.

As such, the system can provide a relatively rapid and efficient installation process for coupling the object to the structure. Additionally, for example, an operator can quickly remove the object from the structure by decoupling the ferromagnetic retainer of the fastener from the magnet of bracket, moving the fastener back along the length from the second position to the first position, and withdrawing the ferromagnetic retainer out of the bracket through the first aperture section. This can facilitate relatively rapid and efficient replacement, repair, and/or maintenance of the object and/or the structure.

Also, within examples, the system can help to support the object against varying directional loads on the object. For instance, within examples, the magnet can be in a pocket, which is recessed from a shelf within the cavity. When the ferromagnetic retainer of the fastener is coupled to the magnet in the pocket of the bracket, a lateral surface of the pocket can abut a side surface of the ferromagnetic retainer and thereby support the fastener against loads applied in a direction transverse to a longitudinal axis of the fastener. Additionally, for example, when the ferromagnetic retainer of the fastener is coupled to the magnet of the bracket, the distal bracket portion at the second aperture section can abut the stem and support the stem against a force transverse to the longitudinal axis of the fastener.

These features may be particularly beneficial in environments in which forces in directions other than the force of gravity may be applied to the object and the fastener. For example, during flight, an aircraft may experience loads in directions other than the force of gravity. As such, within examples, the systems and methods of the present application can help to secure an object to a structure in an aircraft. However, the systems and methods of the present disclosure can be used in other environments in other examples.

Figure 1B:
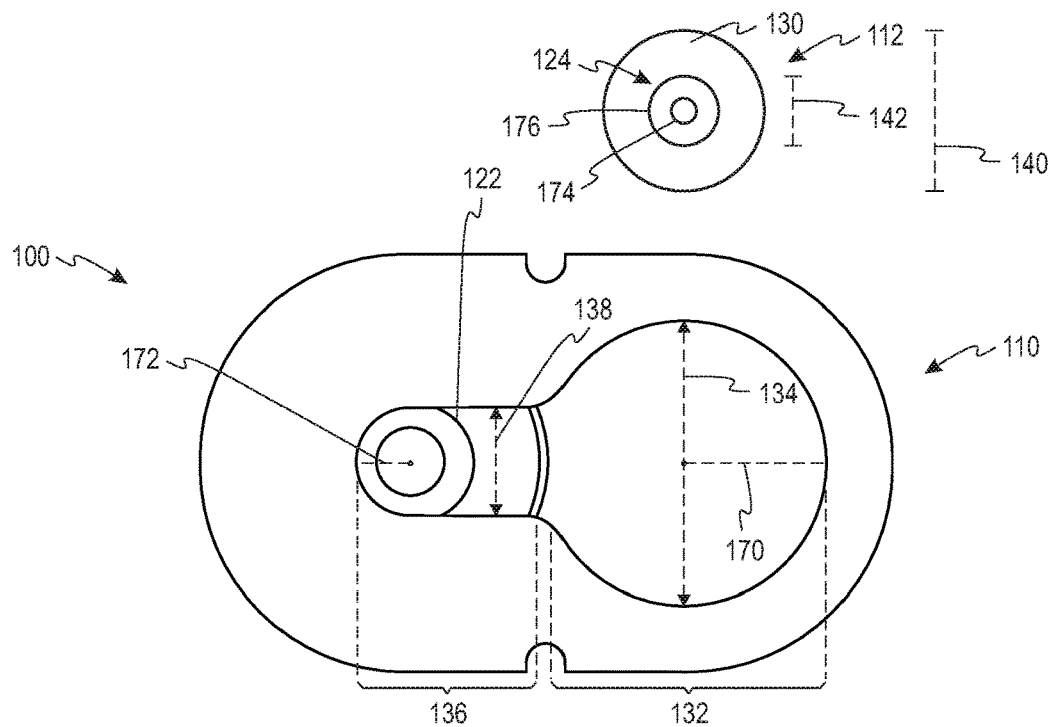
FIG. 1B illustrates a top view of the system in the decoupled state, according to an example.
Figure 1C:
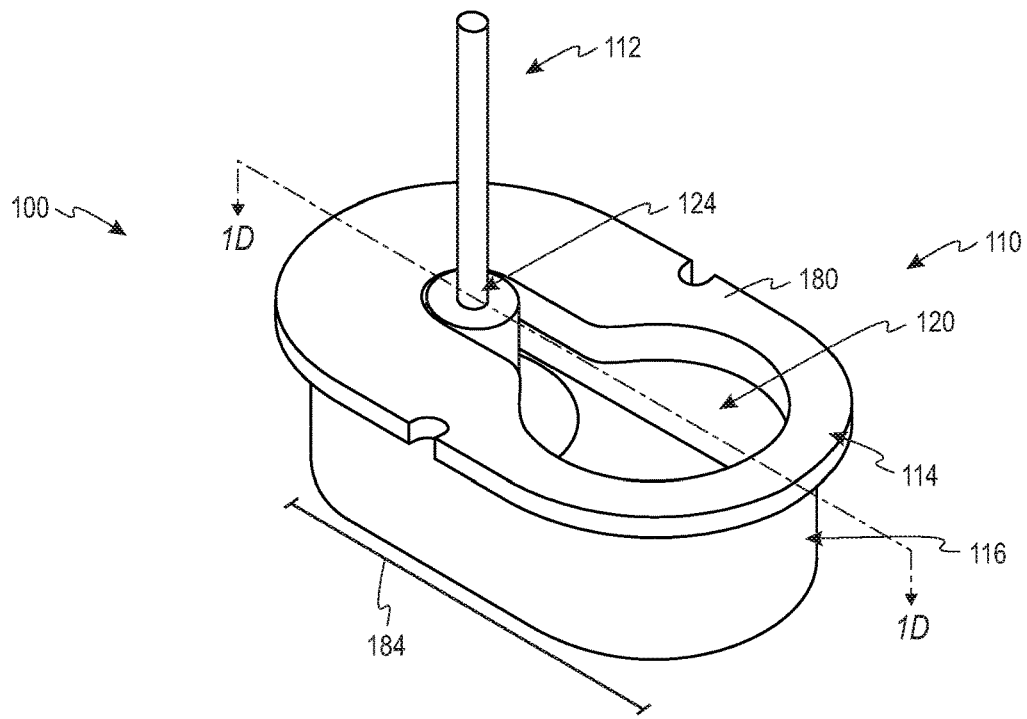
FIG. 1C illustrates a perspective view of the system in a coupled state, according to an example.
Figure 1D:
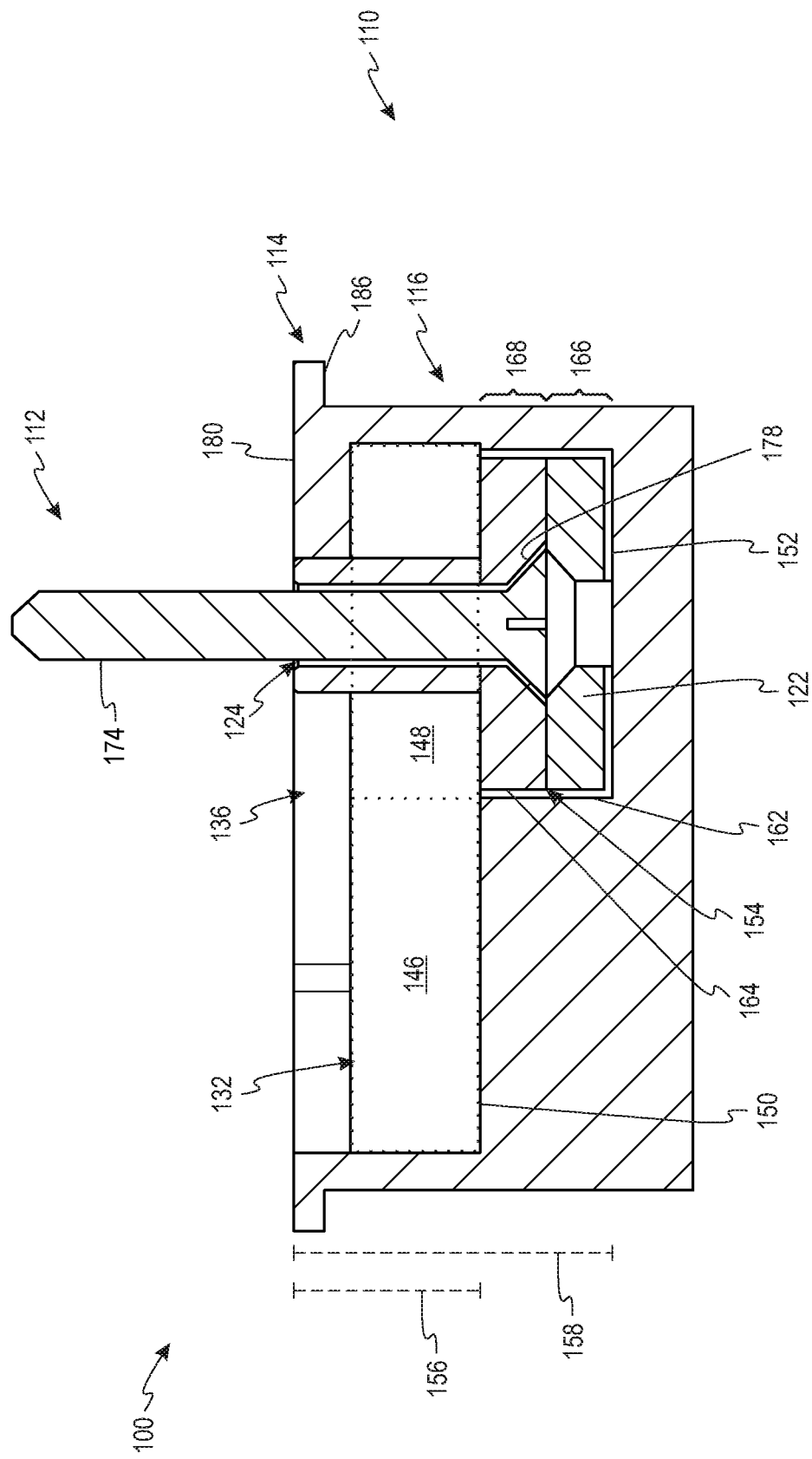
FIG. 1D illustrates a cross-sectional view of the system in the coupled state, according to an example.

Referring now to FIGS. 1A-1D, a system 100 is shown according to an example. More specifically, FIG. 1A is a perspective view of the system 100 in a decoupled state, FIG. 1B is a top view of the system 100 in the decoupled state, FIG. 1C is a perspective view of the system 100 in a coupled state, and FIG. 1D is a cross-sectional view of the system 100 in the coupled state.

As shown in FIGS. 1A-1D, the system 100 includes a bracket 110 and a fastener 112. The bracket 110 includes a distal bracket portion 114 and a proximal bracket portion 116, which extends from the distal bracket portion 114. In FIGS. 1A-1D, the bracket 110 has an oblong shape (e.g., an elongated oval shape). As described below, this can provide for a relatively compact size of the bracket 110 while allowing for the fastener 112 to translate within the bracket 110 to couple and decouple the fastener 112 and the bracket 110 (e.g., to transition the system 100 between the decoupled state and the coupled state). However, in other examples, the bracket 110 can have a different shape than that shown in FIGS. 1A-1D.

The bracket 110 includes a cavity 118 that is defined by the distal bracket portion 114 and the proximal bracket portion 116. The distal bracket portion 114 further defines an aperture 120 that provides access to the cavity 118. As shown in FIGS. 1A, 1B, and 1D, the bracket 110 includes a magnet 122 in the cavity 118, and coupled to the proximal bracket portion 116. As shown in FIGS. 1C-1D, when the system 100 is in the coupled state, the fastener 112 extends through the aperture 120 and is coupled to the magnet 122 in the cavity 118.

The fastener 112 includes a stem 124 extending from a first end 126 to a second end 128. The first end 126 is configured to couple to an object. As examples, the object can include a signage panel, a decorative panel, a magazine rack, a literature pocket, and/or a branding feature. Also, within examples, the first end 126 of the stem 124 can couple to an interior portion of the object such that the fastener 112 is not visible on one side of the object. As such, the system 100 can help to improve the aesthetic appeal of the object relative to other systems in which the fastener is visible on both sides of the object. Although it may be beneficial to couple the first end 126 of the stem 124 to the interior portion of the object such that the fastener 112 is not visible on one side of the object, the fastener 112 can be visible on both sides of the object in other examples.

As examples, the first end 126 of the stem 124 can couple to the object by a threaded coupling, a press-fit coupling, an adhesive, a welded coupling, a soldered coupling, and/or a brazing coupling. Threadedly coupling the first end 126 of the stem 124 to the object can help to facilitate maintenance and/or repair by allowing for the fastener 112 to be efficiently and/or rapidly replaced. Threadedly coupling the first end 126 to the object can additionally or alternatively allow for the fastener 112 to be decoupled from one object and then coupled to another object (i.e., replacing the object coupled to the fastener 112), which can thus extend the useful life of the fastener 112.

As shown in FIGS. 1A-1D, the fastener 112 also includes a ferromagnetic retainer 130 at the second end 128 of the stem 124. In general, the ferromagnetic retainer 130 is magnetically coupled to the magnet 122 of the bracket 110 when the system 100 is in the coupled state. In one example, the magnet 122 of the bracket 110 and the ferromagnetic retainer 130 of the fastener 112 can have a holding strength of at least approximately ten pounds. In another example, the magnet 122 of the bracket 110 and the ferromagnetic retainer 130 can have a holding strength of approximately 2.5 pounds to approximately 8 pounds. As used herein, the term "holding strength" means a minimum amount of force that can be applied to the ferromagnetic retainer 130 to overcome the magnetic force(s) between the magnet 122 and the ferromagnetic retainer 130, and decouple the ferromagnetic retainer 130 from the magnet 122.

In one example, the magnet 122 of the bracket 110 can be a permanent magnet and the ferromagnetic retainer 130 can be a temporary magnet that is configured to be temporarily magnetized by the magnet 122 of the bracket 110 when the temporary magnet is within a magnetic field of the magnet 122 of the bracket 110. As such, the ferromagnetic retainer 130 can be attracted to the magnet 122 when the ferromagnetic retainer 130 is located in the magnetic field of the magnet 122 of the bracket 110. In this example, because the ferromagnetic retainer 130 is a temporary magnet, the ferromagnetic retainer 130 may not be magnetized when the system 100 is in the decoupled state. This may help to inhibit (or prevent) the ferromagnetic retainer 130 from inadvertently coupling with other ferromagnetic objects in an environment external to the bracket 110 when the system 100 is in the decoupled state. As such, the temporary magnet of the ferromagnetic retainer 130 can help to facilitate handling of the fastener 112 when the system 100 is in the decoupled state.

In another example, the magnet 122 of the bracket 110 is a first permanent magnet and the ferromagnetic retainer 130 of the fastener 112 is a second permanent magnet, which has a polarity that is opposite a polarity of the first permanent magnet. In this arrangement, the magnet 122 of the bracket 110 and the ferromagnetic retainer 130 of the fastener 112 are magnetically attracted to each other. Because the magnet 122 and the ferromagnetic retainer 130 are permanent magnets that are attracted to each other, the magnet 122 and the ferromagnetic retainer 130 each have a respective pull strength that combines to achieve the holding strength between the magnet 122 and the ferromagnetic retainer 130. As such, the respective pull strengths of the magnet 122 and the ferromagnetic retainer 130 can be less than the holding strength. This can allow for the magnet 122 and/or the ferromagnetic retainer 130 to have a reduced (or minimized) size and/or weight relative to other examples in which only the magnet 122 is a permanent magnet. This may be particularly beneficial in, for example, aerospace systems in which reducing weight can result in increased fuel efficiency and/or flight range.

In some implementations, the pull strength of the magnet 122 can be approximately equal to the pull strength of the ferromagnetic retainer 130. For instance, in an example in which the holding strength is at least approximately 10 pounds, the magnet 122 of the bracket 110 and the ferromagnetic retainer 130 can each have a respective pull strength of approximately five pounds. This may be beneficial, for example, in implementations in which the magnet 122 and the ferromagnetic retainer 130 have a substantially similar size, shape, and/or material. In other examples, however, the pull strength of the magnet 122 can be less than or greater than the pull strength of the ferromagnetic retainer 130. This may be beneficial, for example, in which the magnet 122 and the ferromagnetic retainer 130 differ in size, shape, and/or material.

As examples, the magnet 122 and/or ferromagnetic retainer 130 can be made from one or more rare earth magnets, ferrous metals, alnico (e.g., including aluminum, nickel, and cobalt), a ceramic magnet (e.g., ferrite), and/or neodymium. More generally, at least one of the magnet 122 and the ferromagnetic retainer 130 is made from a material that provides a magnetic field (e.g., a permanent magnet) for magnetically coupling the magnet 122 and the ferromagnetic retainer 130.

As shown in FIG. 1B, the aperture 120 includes a first aperture section 132 of a first width 134 and a second aperture section 136 of a second width 138. In general, the second width 138 of the second aperture section 136 is less than the first width 134 of the first aperture section 132. Additionally, as shown in FIG. 1B, the ferromagnetic retainer 130 has a third width 140 that is less than the first width 134 of the first aperture section 132 and greater than the second width 138 of the second aperture section 136. In this arrangement, the first aperture section 132 can receive the ferromagnetic retainer 130 into the cavity 118, and the second aperture section 136 can inhibit egress of the ferromagnetic retainer 130 from the cavity 118. As described in further detail below, this can help to reduce (or minimize) a risk of the fastener 112 inadvertently decoupling from the bracket 110.

As shown in FIG. 1B and FIG. 1C, the stem 124 can have a fourth width 142 that generally corresponds to the second width 138 of the second aperture section 136. As such, when the ferromagnetic retainer 130 of the fastener 112 is magnetically coupled to the magnet 122 of the bracket 110, the distal bracket portion 114 at the second aperture section 136 abuts the stem 124 and supports the stem 124 against a force transverse to a longitudinal axis 144 of the stem 124. This can help to resist such transverse forces, which may be inadvertently applied to the object coupled to the first end 126 of the fastener 112, and thus assist in mitigating (or preventing) inadvertent decoupling of the fastener 112 from the bracket 110.

The cavity 118 includes a first cavity portion 146 and a second cavity portion 148. As shown in FIG. 1D, the first cavity portion 146 extends from the first aperture section 132 to a shelf 150 of the proximal bracket portion 116, and the second cavity portion 148 extends from the second aperture section 136 to a proximal surface 152 of a pocket 154 that is recessed relative to the shelf 150. More specifically, the first cavity portion 146 extends from the first aperture section 132 to the shelf 150 at a first depth 156 in the cavity 118, and the second cavity portion 148 extends from the second aperture section 136 to the proximal surface 152 at a second depth 158 in the cavity 118. As shown in FIG. 1D, the second depth 158 is greater than the first depth 156 such that the second cavity portion 148 includes the pocket 154, which is recessed relative to the shelf 150.

As the pocket 154 is recessed relative to the shelf 150, the pocket 154 can include the proximal surface 152 and a lateral surface 162. In general, the lateral surface 162 can (i) extend from the proximal surface 152 to the first depth 156 (e.g., extend from the proximal surface 152 to the shelf 150), and (ii) extend around a perimeter of the pocket 154. In FIGS. 1A-1D, the pocket 154 has a circular cross-sectional shape and the lateral surface 162 is a single, continuous surface extending around the perimeter of the pocket 154. However, in other examples, the lateral surface 162 can include a plurality of surfaces and one or more interfaces between the surfaces (e.g., one or more corners).

The magnet 122 of the bracket 110 is in the pocket 154 and coupled to the proximal bracket portion 116. For example, in FIG. 1D, the magnet 122 can be coupled to the proximal bracket portion 116 in a proximal section 166 of the pocket 154. In this example, a distal section 168 of the pocket 154 can be configured to receive the ferromagnetic retainer 130. In this arrangement, the magnet 122 is configured to apply a magnetic force to move the ferromagnetic retainer 130 in a direction from the first cavity portion 146 to the second cavity portion 148, and magnetically couple to the ferromagnetic retainer 130 in the pocket 154. When the ferromagnetic retainer 130 of the fastener 112 is magnetically coupled to the magnet 122 of the bracket 110, the lateral surface 162 of the pocket 154 abuts a side surface 164 of the ferromagnetic retainer 130. As such, the lateral surface 162 of the pocket 154 can help to support the fastener 112 against loads applied in directions transverse to the longitudinal axis 144 of the stem 124.

As noted above, the pocket 154 can have a circular cross-sectional shape. Within examples, the ferromagnetic retainer 130 also can have a circular cross-sectional shape. This can beneficially allow the pocket 154 to receive the ferromagnetic retainer 130 in all rotational alignments of the ferromagnetic retainer 130 relative to the pocket 154 and, thus, facilitate efficiently and rapidly coupling the fastener 112 to the bracket 110. However, in other examples, the pocket 154 and/or the ferromagnetic retainer 130 can have different cross-sectional shapes than those shown in FIGS. 1A-1D.

Additionally, for example, the first aperture section 132 can be defined, at least in part, by a first radius of curvature 170. As such, the first aperture section 132 can have a substantially circular shape. This can provide for a relatively compact size of the first aperture section 132 while allowing the first aperture section 132 to receive the ferromagnetic retainer 130 in all rotational alignments of the ferromagnetic retainer 130 relative to the first aperture section 132. As such, the relative shapes of the first aperture section 132 and the ferromagnetic retainer 130 can facilitate efficiently and rapidly coupling the fastener 112 to the bracket 110.

As shown in FIG. 1B, the stem 124 can also have a circular cross-sectional shape. Additionally, the second aperture section 136 can be defined, at least in part, by a second radius of curvature 170. This can, for example, allow the stem 124 (and thus the object coupled to the stem 124) to rotate when the stem 124 is located in the second aperture section 136. This may be beneficial in scenarios in which it may be desirable to be able to rotate the object while coupling the fastener 112 to the bracket 110. Additionally, for example, when the ferromagnetic retainer 130 of the fastener 112 is magnetically coupled to the magnet 122 of the bracket 110, the distal bracket portion 114 at the second aperture section 136 can abut the stem 124 along approximately 180 degrees of a circumference of the stem 124 to support the stem 124 against a force transverse to the longitudinal axis 144 of the stem 124.

As noted above, the first aperture section 132 can be defined, at least in part, by the first radius of curvature 170, and the second aperture section 136 can be defined, at least in part, by the second radius of curvature 172. To provide for the first aperture section 132 receiving the ferromagnetic retainer 130 and the second aperture section 136 inhibiting egress of the ferromagnetic retainer 130, the first radius of curvature 170 can be greater than the second radius of curvature 172. In this arrangement, the first aperture section 132 and the second aperture section 136 define a keyhole shape of the aperture 120. However, the aperture 120 can have a different shape in other examples.

In the example shown in FIGS. 1A-1D, the stem 124 of the fastener 112 includes an anchor 174 and a spacer 176. As shown in FIG. 1D, the ferromagnetic retainer 130 can include a countersink 178, and he spacer 176 can have a through-bore. A head of the anchor 174 can be seated in the countersink 178 of the ferromagnetic retainer 130, and the anchor 174 can extend through the ferromagnetic retainer 130 and the spacer 176. Within examples, the spacer 176 can have a length that generally corresponds to a distance between the ferromagnetic retainer 130 and a distal surface 180 of the distal bracket portion 114 when the fastener 112 is coupled to the bracket 110. As such, the spacer 176 can reside in the second aperture section 136 and be generally coplanar with the distal surface 180 when the fastener 112 is coupled to the bracket 110. This can assist in mitigating (or preventing) the spacer 176 from protruding distally of the distal surface 180 of the bracket 110, which might otherwise pose a challenge to coupling an object to the bracket 110 with a relatively small gap (or no gap) between the object and the bracket 110.

In other examples, the ferromagnetic retainer 130 can be coupled to the second end 128 of the stem 124 by, for instance, a threaded coupling, a press-fit coupling, an adhesive, a welded coupling, a soldered coupling, and/or a brazing coupling. Also, in other examples, the stem 124 and/or the ferromagnetic retainer 130 can be a monolithic structure (i.e., a single, one-part structure).

As described above, the magnet 122 can be coupled to the proximal bracket portion 116 in the pocket 154. In one example, the magnet 122 can include a bore 182, and the magnet 122 can be coupled to the proximal bracket portion 116 by a screw and/or a bolt (not shown) extending through the bore 182 into the proximal bracket portion 116. In other examples, the magnet 122 can omit the bore 182 and instead be solid throughout the magnet 122 (e.g., the magnet 122 can have a puck shape). In such examples, the magnet 122 can be coupled to the proximal bracket portion 116 by a threaded coupling, a press-fit coupling, an adhesive, a welded coupling, a soldered coupling, and/or a brazing coupling. Threadedly coupling the magnet 122 to the proximal bracket portion 116 can help to facilitate maintenance and/or repair of the magnet 122. In examples in which the magnet 122 is a solid structure omitting the bore 182, the magnet 122 can provide a particular pull strength in a relatively more compact space than examples in which the magnet 122 includes the bore 182.

As shown in FIG. 1A-1C, the bracket 110 can include a flange 186 extending outwardly from the proximal bracket portion 116, and the flange 186 can include one or more notches 188. As described in further detail below, the flange 186 and/or the notch(es) 188 can assist in coupling the bracket 110 to a structure such as, for example, a composite panel sandwich.

Accordingly, in the example shown in FIGS. 1A-1D, the bracket 110 and fastener 112 are configured such that: (i) the ferromagnetic retainer 130 is insertable into the cavity 118 through the first aperture section 132, (ii) while the ferromagnetic retainer 130 is in the cavity 118, the stem 124 is movable along a length 184 of the bracket 110 from a first position in the first aperture section 132 to a second position in the second aperture section 136, and (iii) when the stem 124 is at the second position in the second aperture section 136, the ferromagnetic retainer 130 magnetically couples to the magnet 122 in the cavity 118.

Referring now to FIGS. 2A-6B, a process for coupling an object 399 to a structure is depicted according to an example. In FIGS. 2A-6B, the object 399 is a signage panel and the structure is a composite sandwich panel 290. However, the object 399 can additionally or alternatively include a decorative panel, a magazine rack, a literature pocket, and/or a branding feature. Also, within examples, the structure can additionally or alternatively include a high density hetrafoam.

Figure 2B:
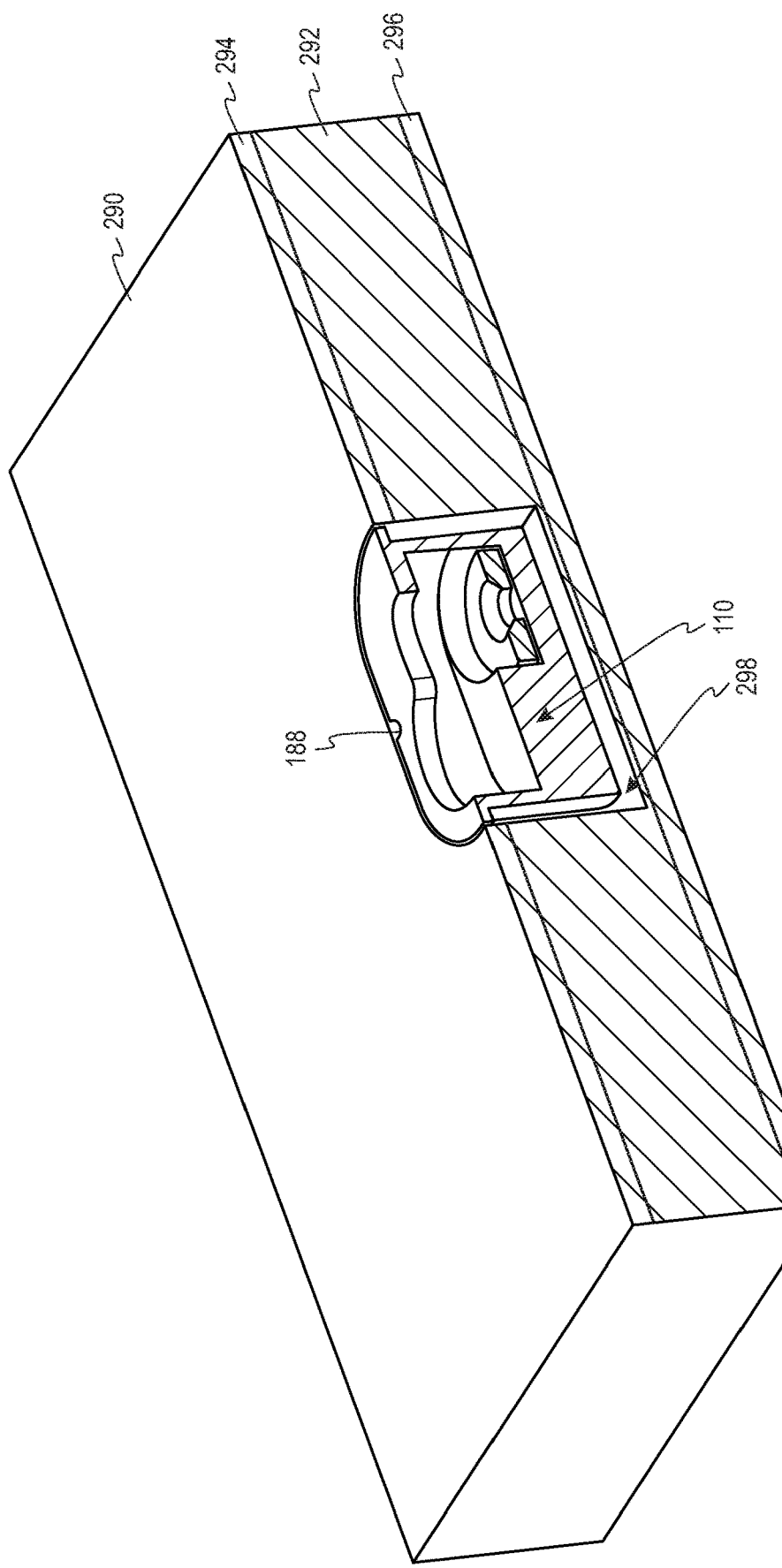
FIG. 2B illustrates a cross-sectional view of the system at the first stage of the process for coupling the object to the structure, according to an example.

FIG. 2A depicts a perspective view of the composite sandwich panel 290 and the bracket 110, and FIG. 2B depicts a cross-sectional view of the composite sandwich panel 290 and the bracket 110. As shown in FIG. 2B the composite sandwich panel 290 includes a core 292 between a first skin 294 and a second skin 296. Within examples, the first skin 294 and the second skin 296 are relatively thin facings, which are coupled on opposing sides of the relatively thicker core 292. As examples, the first skin 294 and the second skin 296 can be formed of laminates of glass, thermoset polymers, carbon fiber-reinforced thermoplastics, or sheet metal. Also, as examples, the core 292 can be formed of an open-cell-structured foam and/or a closed-cell-structured foam such as polyethersulfone, polyvinylchloride, polyurethane, polyethylene or polystyrene foams, syntactic foams, balsa wood, or honeycomb structures (e.g., paper or cardboard formed into honeycomb structures). In this arrangement, the composite sandwich panel 290 can provide a lightweight yet strong panel structure.

The composite sandwich panel 290 defines a hole 298 extending through the first skin 294 and a portion of the core 292. As shown in FIGS. 2A-2B, the bracket 110 is inserted in the hole 298 of the composite sandwich panel 290. While the bracket 110 is in the hole 298, a first amount of an adhesive can be applied through a first one of the notches 188 in the flange 186 of the bracket 110. In one example, the first amount of adhesive can be applied through the first one of the notches 188 until the adhesive egresses from the hole 298 out of the second one of the notches 188 on an opposite side of the bracket 110. In this example, a second amount of the adhesive can then be applied to the second one of the notches 188 until the adhesive egresses from the hole 298 out of the first one of the notches 188. Applying the first amount of the adhesive in the first one of the notches 188 and then applying the second amount of the adhesive in the second one of the notches 188 can help to ensure that the adhesive is well distributed between the bracket 110 and the composite sandwich panel 290 in the hole 298. The adhesive can then cure to couple the bracket 110 to the composite sandwich panel 290.

Although the bracket 110 can be coupled to the composite sandwich panel 290 in some examples, the bracket 110 can be additionally or alternatively coupled to the composite sandwich panel in different ways in other examples (e.g., by a threaded coupling between the bracket 110 and the composite sandwich panel 290).

Figure 3B:
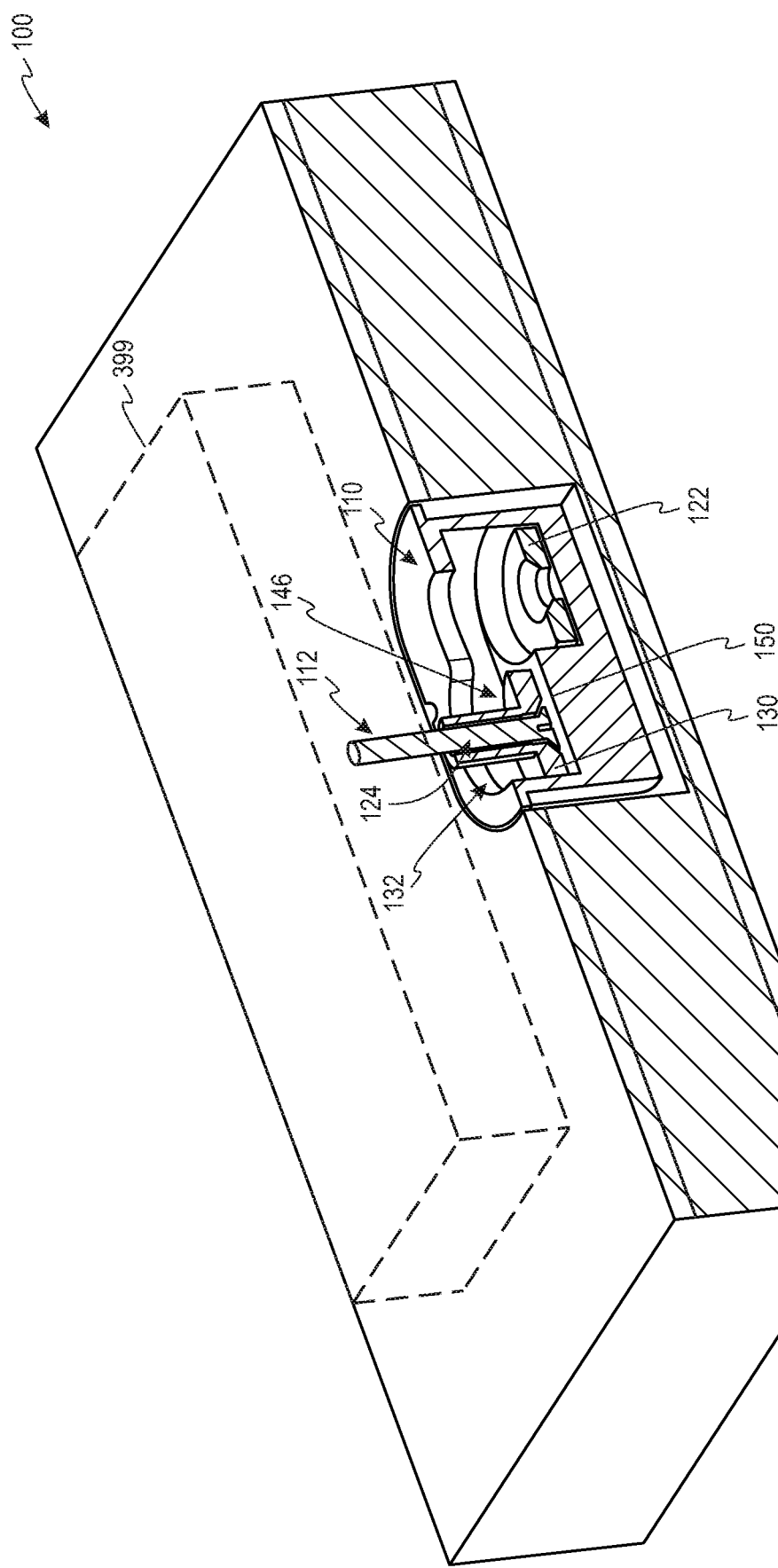
FIG. 3B illustrates a cross-sectional view of the system at the second stage of the process for coupling the object to the structure, according to an example.

The fastener 112 can be coupled to the object 399 as described above, and then the fastener 112 can be coupled to the bracket 110 in the composite sandwich panel 290. Additionally, as described above, the bracket 110 is configured to receive the ferromagnetic retainer 130 of the fastener 112 in the first cavity portion 146 via the first aperture section 132. FIG. 3A and FIG. 3B depict a perspective view and a cross-sectional view, respectively, of the system 100 after the fastener 112 is coupled to the object 399 and the fastener 112 is inserted through the first aperture section 132 into the first cavity portion 146 of the bracket 110. To more clearly illustrate certain features of the system 100, the object 399 is shown in broken lines. As shown in FIGS. 3A-3B, the first end 126 of the stem 124 is coupled to an interior portion 395 of the object 399 such that the fastener 112 is not visible on one side 397 of the object 399.

Additionally, as shown in FIGS. 3A-3B, the fastener 112 is in a first position in which the ferromagnetic retainer 130 is at the shelf 150 in the first cavity portion 146, and the stem 124 extends through the first aperture section 132. When the fastener 112 is inserted in the bracket 110, the fastener 112 can contact the shelf 150. In this way, the shelf 150 can provide an indication that the fastener 112 is fully inserted in the first cavity portion 146.

After inserting the fastener 112 to the first position, the fastener 112 can be translated from (i) the first position in which the stem 124 extends through the first aperture section 132 to (ii) a second position in which the stem 124 extends through the second aperture section 136. Within examples, the fastener 112 can translate from the first position to the second position responsive to a mechanical force applied to the fastener 112 (e.g., by an operator moving the object 399), a gravitational force on the fastener 112, and/or a magnetic force applied by the magnet 122 on the ferromagnetic retainer 130 of the fastener 112.

FIGS. 4A and 4B depict a perspective view and a cross-sectional view, respectively, of the system 100 as the fastener 112 translates from the first position to the second position. As shown in FIGS. 4A and 4B, the stem 124 has translated from the first aperture section 132 to the second aperture section 136, and the ferromagnetic retainer 130 has translated along the shelf 150 toward the magnet 122 in the pocket 154. Within examples, the shelf 150 and/or the second aperture section 136 can help to guide the fastener 112 as the fastener 112 translates from the first position to the second position. For instance, the ferromagnetic retainer 130 can slide along the shelf 150 and/or the stem 124 can be guided along a path provided by the second aperture section 136 due to the relatively similar widths of the stem 124 and the second aperture section 136.

Figure 5A:
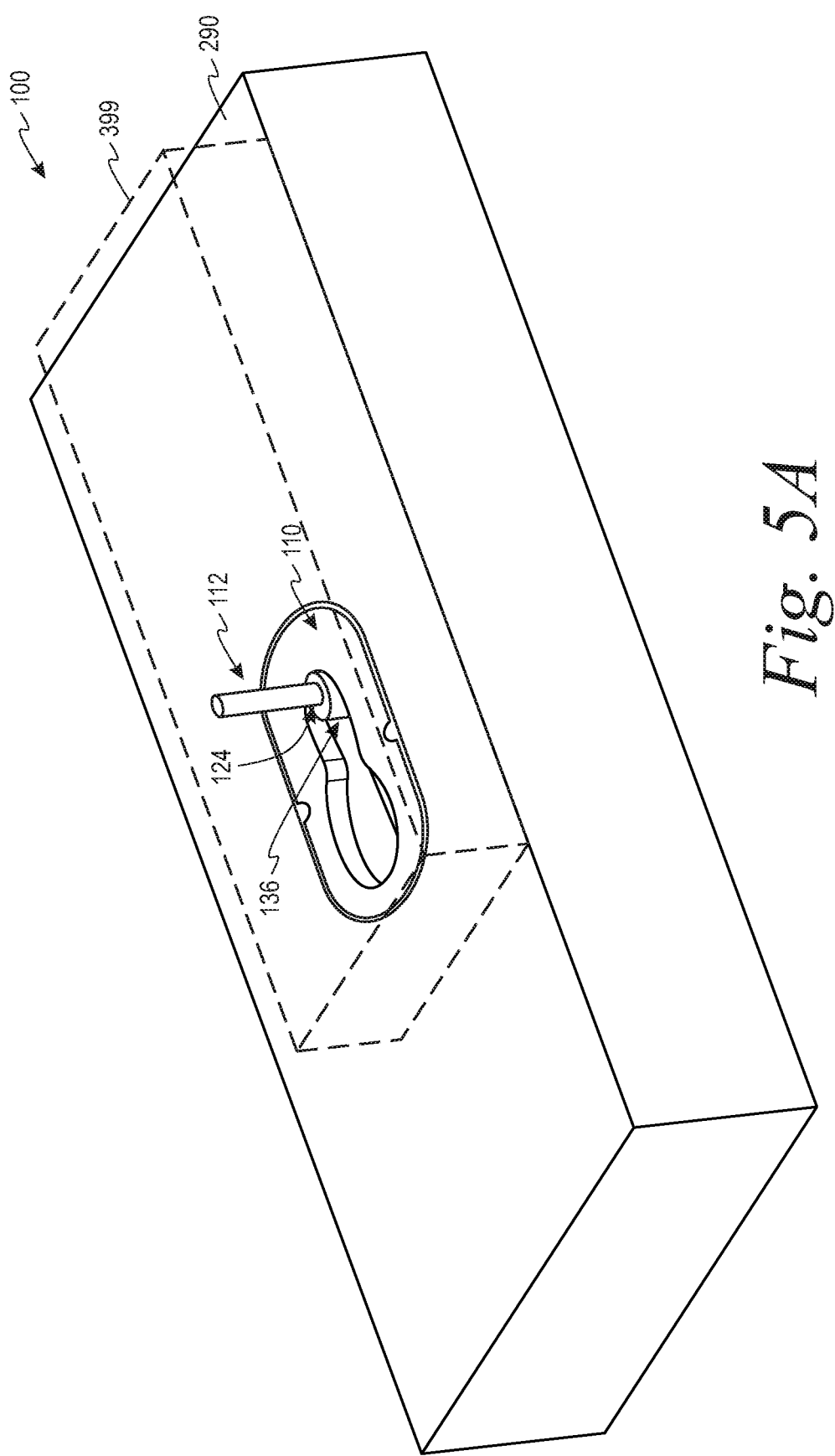
FIG. 5A illustrates a perspective view of the system at a fourth stage of the process for coupling the object to the structure, according to an example.

FIGS. 5A and 5B depict a perspective view and a cross-sectional view, respectively, of the system 100 with the fastener 112 at the second position in the bracket 110. As shown in FIGS. 5A and 5B, the ferromagnetic retainer 130 of the fastener 112 is magnetically coupled to the magnet 122 in the pocket 154 of the proximal bracket portion 116. In this position, the side surface 164 of the ferromagnetic retainer 130 abuts against the lateral surface 162 of the pocket 154. As such, the pocket 154 of the bracket 110 can support the fastener 112 against forces transverse to the longitudinal axis 144 (FIG. 1A) of the fastener 112. Additionally, in FIGS. 5A and 5B, when the ferromagnetic retainer 130 of the fastener 112 is magnetically coupled to the magnet 122 of the bracket 110, the distal bracket portion 114 at the second aperture section 136 abuts the stem 124 and supports the stem 124 against a force transverse to a longitudinal axis 144 of the stem 124.

The fastener 112 can remain coupled to the bracket 110 until a breakaway force is applied to the fastener 112 to overcome the holding strength between the magnet 122 and the ferromagnetic retainer 130. In an example, the breakaway force can be applied to the fastener 112 by pulling the fastener distally until the ferromagnetic retainer 130 stops against a proximal ledge 660 of the distal bracket portion 114.

Figure 6A:
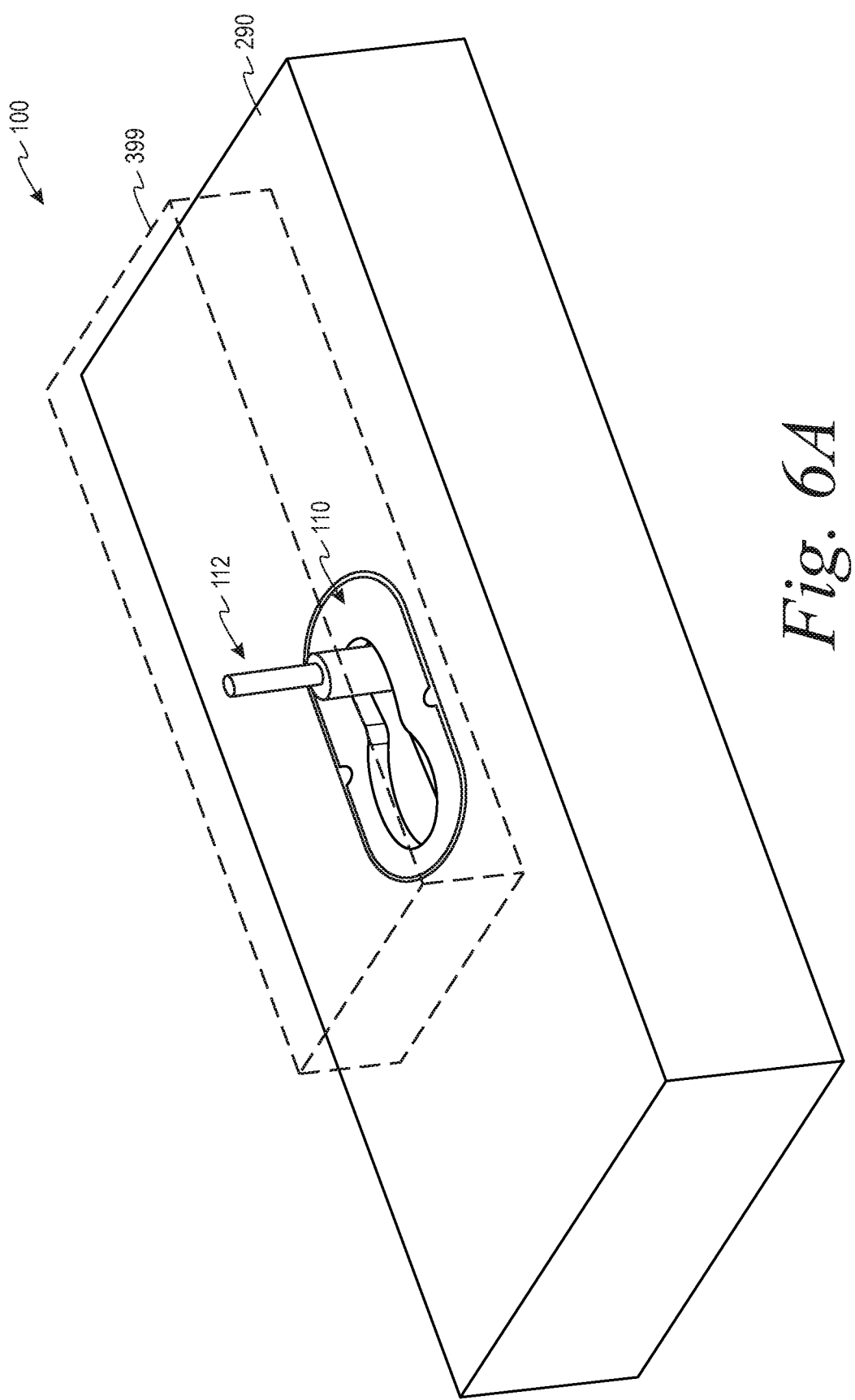
FIG. 6A illustrates a perspective view of the system during a process for decoupling the object from the structure, according to an example.
Figure 6B:
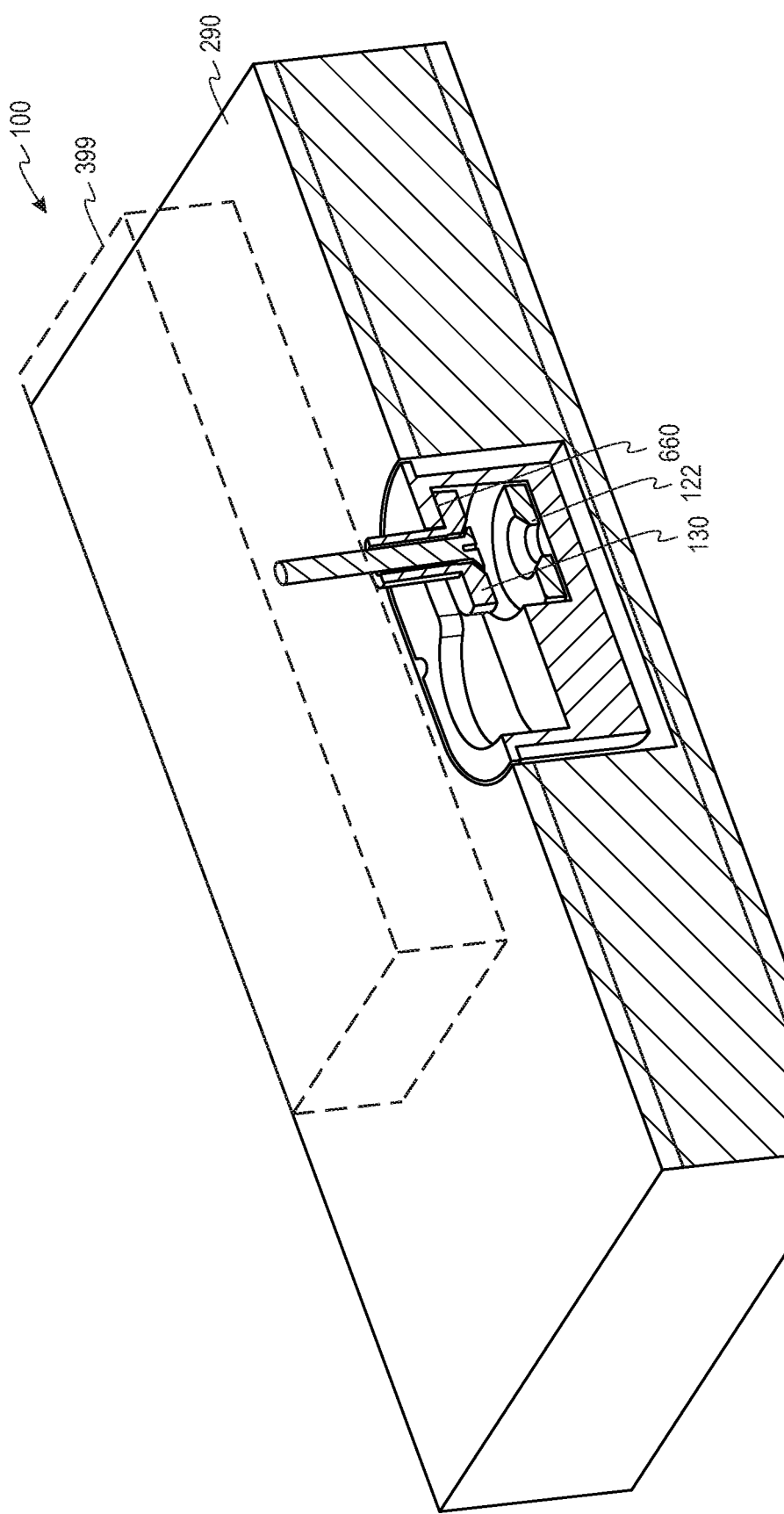
FIG. 6B illustrates a cross-sectional view of the system during a process for decoupling the object from the structure, according to an example.

FIGS. 6A and 6B depict a perspective view and a cross-sectional view of the system 100 after the breakaway force has been applied to the fastener 112. As shown in FIGS. 6A and 6B, at the second aperture section 136, the distal bracket portion 114 includes a proximal ledge 660 that inhibits egress of the ferromagnetic retainer 130 from the cavity 118 through the second aperture section 136. This is due to the ferromagnetic retainer 130 having the third width 140 that is greater than the second width 138 of the second aperture section 136, as shown in FIG. 1B. In a scenario in which the breakaway force is inadvertently applied to the fastener 112, the proximal ledge 660 can beneficially stop the fastener 112 from completely withdrawing out of the bracket 110. This may help to improve safety as a likelihood of the object 399 completely coming off the bracket 110 and the composite sandwich panel 290 is reduced (or minimized) by the proximal ledge 660.

After applying the breakaway force, the fastener 112 can be translated back from the second position to the first position shown in FIGS. 3A and 3B and withdrawn from the cavity 118 through the first aperture section 132. Accordingly, the system 100 can provide for a quick-release coupling between the fastener 112 and the bracket 110, which allows for relatively rapid and efficient replacement, maintenance, and/or repair of the object 399.

FIGS. 2A-6B depict the object 399 coupled to the structure (i.e., the composite sandwich panel 290) by the bracket 110 and the fastener 112. In general, the object 399 can be coupled to the structure by one or more brackets 110 and one or more fasteners 112. For example, in some implementations, the object 399 can be coupled to the structure by a plurality of brackets 110 and a plurality of fasteners 112. By coupling the object 399 to the structure using a plurality of brackets 110 and a plurality of fasteners 112, the object 399 can be secured to the structure with a holding strength that is approximately equal to a combination of the respective holding strength of each pair of brackets 110 and fasteners 112.

Figure 7A:
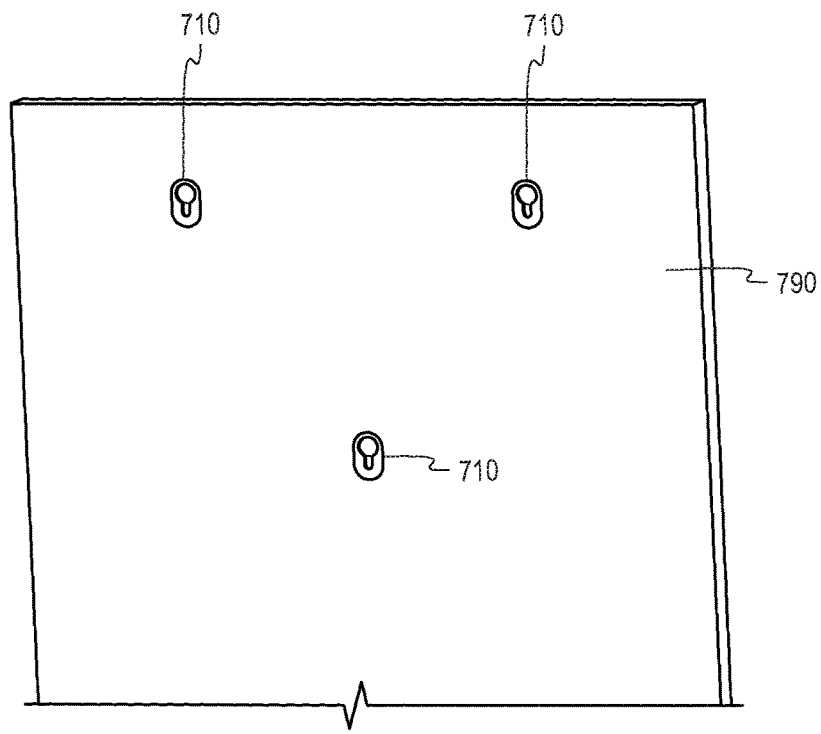
FIG. 7A illustrates a structure including a plurality of brackets, according to an example.
Figure 7B:
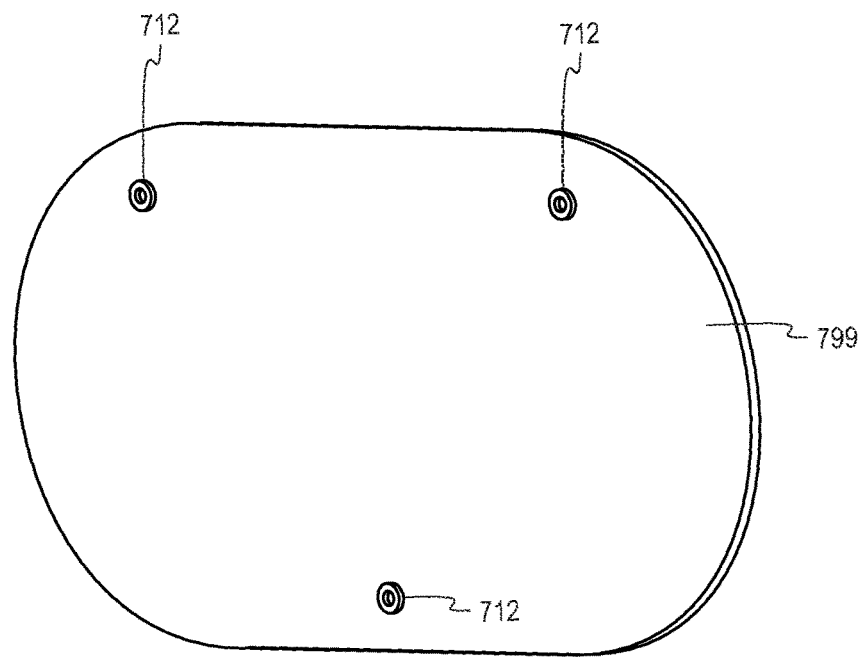
FIG. 7B illustrates an object including a plurality of fasteners, according to an example.
Figure 7C:
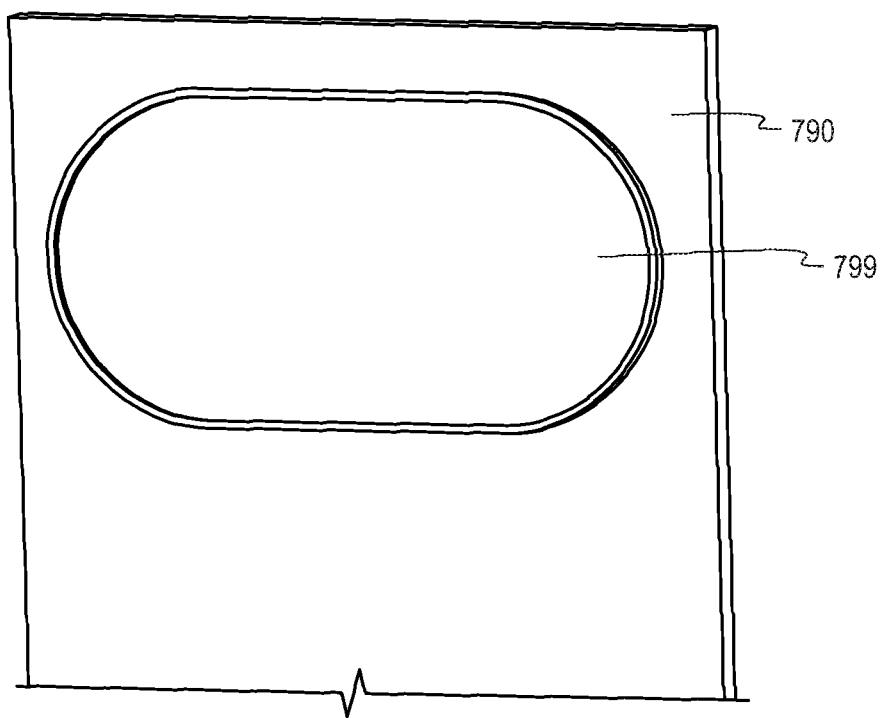
FIG. 7C illustrates the object shown in FIG. 7B coupled to the structure shown in FIG. 7A, according to an example.

FIGS. 7A-7C depict an object 799 coupled to a structure 790 by a plurality of brackets 710 and a plurality of fasteners 712, according to an example. In particular, FIG. 7A depicts the structure 790 including the brackets 710, FIG. 7B depicts the object 799 including the fasteners 712, and FIG. 7C depicts the object 799 coupled to the structure 790. As shown in FIG. 7C, the brackets 710 and the fasteners 712 are not visible when the object 799 is coupled to the structure 790. This can improve the aesthetic appeal of the object 799 coupled to the structure 790.

Figure 8:
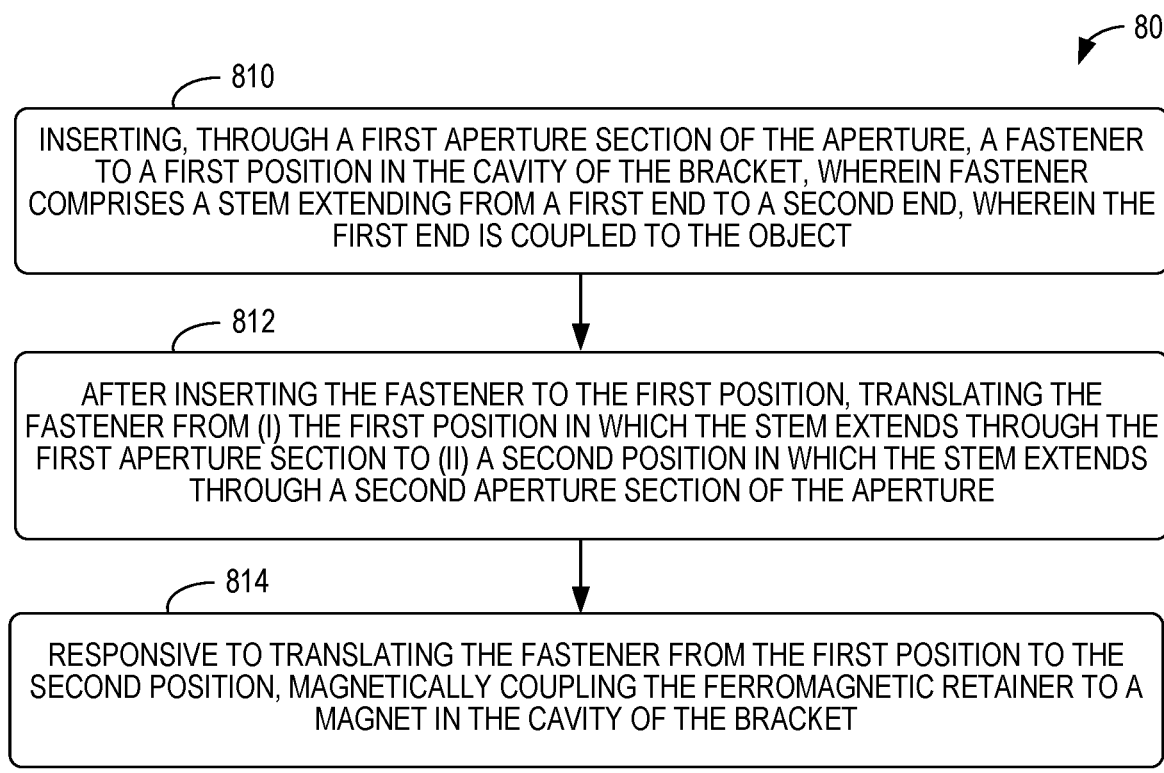
FIG. 8 illustrates a flow chart of an example process for coupling an object to a bracket, according to an example.

Referring now to FIG. 8, a flowchart for a process 800 for coupling an object to a bracket is illustrated according to an example. The bracket includes a distal bracket portion and a proximal bracket portion. The distal bracket portion includes an aperture. The distal bracket portion and the proximal bracket portion define a cavity proximal to the aperture.

As shown in FIG. 8, at block 810, the process 800 includes inserting, through a first aperture section of the aperture, a fastener to a first position in the cavity of the bracket, wherein fastener comprises a stem extending from a first end to a second end. The first end is coupled to the object. The fastener includes a ferromagnetic retainer at the second end of the stem. The ferromagnetic retainer is in the cavity when the fastener is at the first position.

After inserting the fastener to the first position, the process 800 includes translating the fastener from (i) the first position in which the stem extends through the first aperture section to (ii) a second position in which the stem extends through a second aperture section of the aperture at block 812. Responsive to translating the fastener from the first position to the second position at block 812, the process 800 includes magnetically coupling the ferromagnetic retainer to a magnet in the cavity of the bracket at block 814. The first aperture section has a first width, the second aperture section has a second width, and the ferromagnetic retainer has a third width. The third width of the ferromagnetic retainer is less than the first width of the first aperture section to allow for inserting the fastener through the first aperture section to the first position. The third width of the ferromagnetic retainer is greater than the second width of the second aperture section to inhibit withdrawing the fastener through the second aperture section when the fastener is at the second position.

Figure 9:
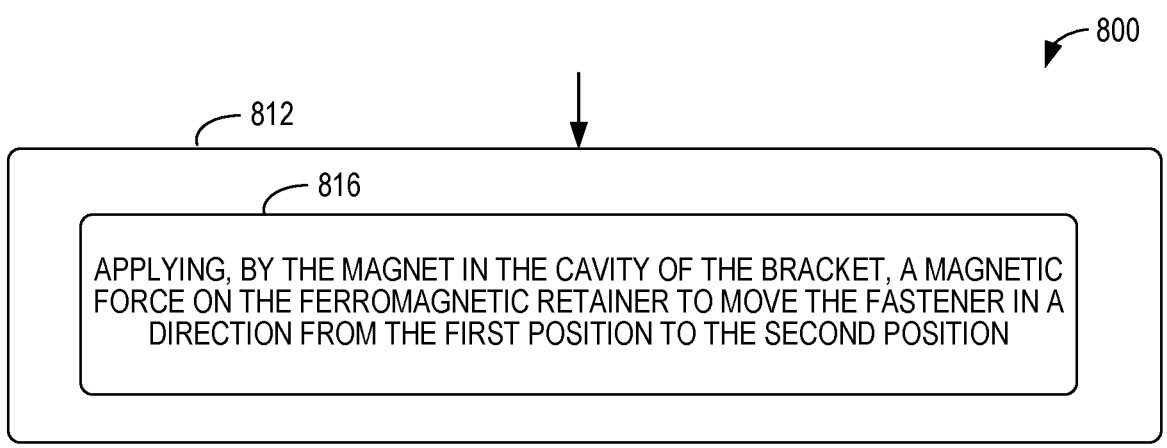
FIG. 9 illustrates a flow chart of an example process for coupling an object to a bracket that can be used with the process shown in FIG. 8.
Figure 10:
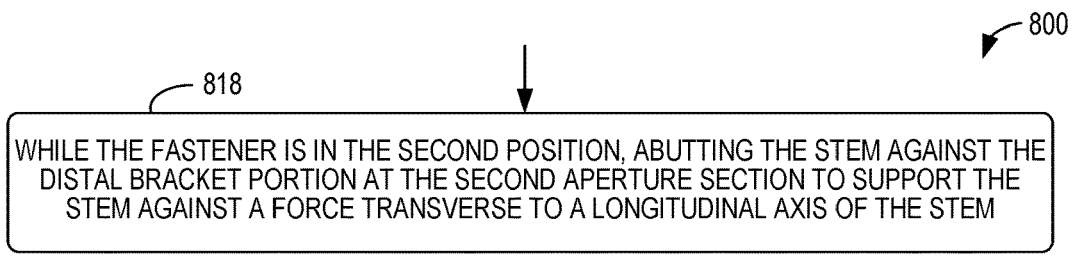
FIG. 10 illustrates a flow chart of an example process for coupling an object to a bracket that can be used with the process shown in FIG. 8.

FIGS. 9-12 depict additional aspects of the process 800 according to further examples. As shown in FIG. 9, translating the fastener from the first position to the second position at block 812 can include applying, by the magnet in the cavity of the bracket, a magnetic force on the ferromagnetic retainer to move the fastener in a direction from the first position to the second position at block 816. As shown in FIG. 10, the process 800 can include, while the fastener is in the second position, abutting the stem against the distal bracket portion at the second aperture section to support the stem against a force transverse to a longitudinal axis of the stem at block 818.

Figure 11:
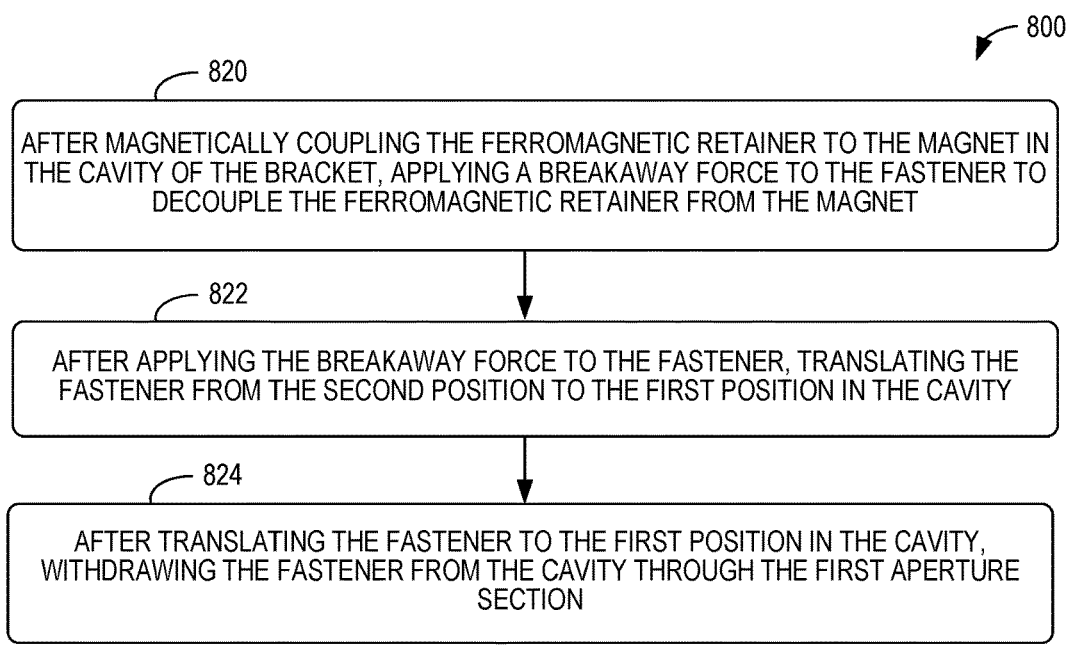
FIG. 11 illustrates a flow chart of an example process for coupling an object to a bracket that can be used with the process shown in FIG. 8.

As shown in FIG. 11, after magnetically coupling the ferromagnetic retainer to the magnet in the cavity of the bracket at block 814, the process 800 can include applying a breakaway force to the fastener to decouple the ferromagnetic retainer from the magnet at block 820. The breakaway force is greater than a holding strength between the magnet in the cavity and the ferromagnetic retainer. After applying the breakaway force to the fastener at block 820, the process 800 can include translating the fastener from the second position to the first position in the cavity at block 822. After translating the fastener to the first position in the cavity at block 822, the process 800 can include withdrawing the fastener from the cavity through the first aperture section at block 824.

Figure 12:
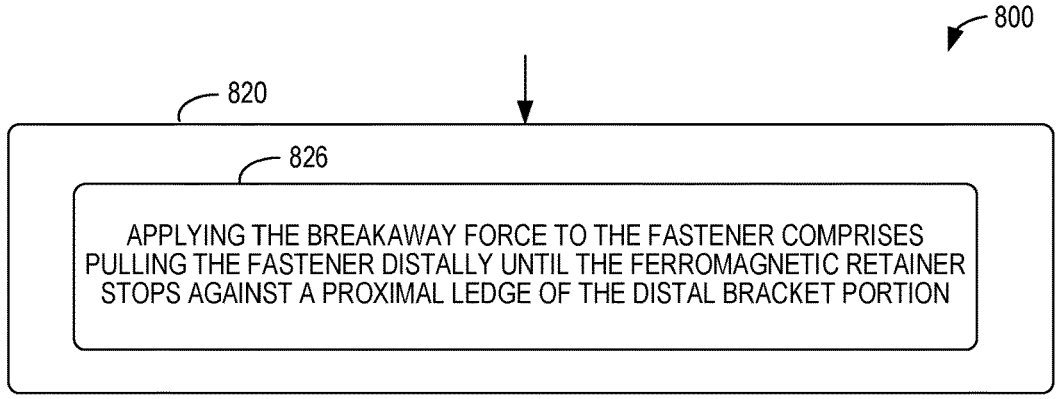
FIG. 12 illustrates a flow chart of an example process for coupling an object to a bracket that can be used with the process shown in FIG. 11.

As shown in FIG. 12, applying the breakaway force to the fastener at block 820 can include pulling the fastener distally until the ferromagnetic retainer stops against a proximal ledge of the distal bracket portion at block 826.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system, comprising:
   a bracket comprising:
      a distal bracket portion defining an aperture, wherein the aperture comprises a first aperture section of a first width and a second aperture section of a second width, wherein the second width is less than the first width,
      a proximal bracket portion extending from the distal bracket portion,
      a cavity defined by the distal bracket portion and the proximal bracket portion, and
      a magnet in the cavity and coupled to the proximal bracket portion; and
   a fastener comprising:
      a stem extending from a first end to a second end, wherein the first end is configured to couple to an object, and
      a ferromagnetic retainer at the second end of the stem, wherein the ferromagnetic retainer has a third width that is less than the first width of the first aperture section and greater than the second width of the second aperture section,
   wherein the bracket and fastener are configured such that: (i) the ferromagnetic retainer is insertable into the cavity through the first aperture section, (ii) while the ferromagnetic retainer is in the cavity, the stem is movable along a length of the bracket from a first position in the first aperture section to a second position in the second aperture section, and (iii) when the stem is at the second position in the second aperture section, the ferromagnetic retainer magnetically couples to the magnet in the cavity,
   wherein the cavity comprises a first cavity portion and a second cavity portion,
   wherein the first cavity portion extends from the first aperture section to a shelf at a first depth in the cavity,
   wherein the second cavity portion extends from the second aperture section to a proximal surface at a second depth in the cavity,
   wherein the second depth is greater than the first depth such that the second cavity portion comprises a pocket that is recessed relative to the shelf, and
   wherein the magnet is in the pocket.

2. The system of claim 1, wherein the first aperture section and the second aperture section define a keyhole shape of the aperture.

3. The system of claim 1, wherein the pocket comprises the proximal surface and a lateral surface, and
   wherein, when the ferromagnetic retainer of the fastener is magnetically coupled to the magnet of the bracket, the lateral surface of the pocket abuts a side surface of the ferromagnetic retainer.

4. The system of claim 1, wherein, at the second aperture section, the distal bracket portion comprises a proximal ledge that inhibits egress of the ferromagnetic retainer from the cavity through the second aperture section.

5. The system of claim 1, wherein the ferromagnetic retainer comprises a permanent magnet.

6. The system of claim 5, wherein the magnet of the bracket and the ferromagnetic retainer each have a respective pull strength of approximately five pounds.

7. The system of claim 1, wherein the ferromagnetic retainer comprises a temporary magnet that is configured to be temporarily magnetized by the magnet of the bracket when the temporary magnet is within a magnetic field of the magnet of the bracket.

8. The system of claim 1, wherein, when the ferromagnetic retainer of the fastener is magnetically coupled to the magnet of the bracket, the distal bracket portion at the second aperture section abuts the stem and supports the stem against a force transverse to a longitudinal axis of the stem.

9. A system, comprising:
   a bracket comprising:
      a distal bracket portion defining an aperture, wherein the aperture comprises a first aperture section of a first width and a second aperture section of a second width, wherein the second width is less than the first width,
      a proximal bracket portion extending from the distal bracket portion,
      a cavity defined by the distal bracket portion and the proximal bracket portion, and
      a magnet in the cavity and coupled to the proximal bracket portion;
   a fastener comprising:

a stem extending from a first end to a second end, wherein the first end is configured to couple to an object, and a ferromagnetic retainer at the second end of the stem, wherein the ferromagnetic retainer has a third width that is less than the first width of the first aperture section and greater than the second width of the second aperture section, wherein the bracket and fastener are configured such that: (i) the ferromagnetic retainer is insertable into the cavity through the first aperture section, (ii) while the ferromagnetic retainer is in the cavity, the stem is movable along a length of the bracket from a first position in the first aperture section to a second position in the second aperture section, and (iii) when the stem is at the second position in the second aperture section, the ferromagnetic retainer magnetically couples to the magnet in the cavity; and a composite sandwich panel including a core between a first skin and a second skin, wherein the composite sandwich panel defines a hole extending through the first skin and a portion of the core, and wherein the bracket is inserted in the hole and coupled to the composite sandwich panel.

10. The system of claim 9, wherein, when the ferromagnetic retainer of the fastener is magnetically coupled to the magnet of the bracket, the distal bracket portion at the second aperture section abuts the stem and supports the stem against a force transverse to a longitudinal axis of the stem.

11. A bracket, comprising:
a distal bracket portion defining an aperture, wherein the aperture comprises a first aperture section of a first width and a second aperture section of a second width, wherein the second width is less than the first width;
a proximal bracket portion extending from the distal bracket portion;
a cavity defined by the distal bracket portion and the proximal bracket portion, wherein the cavity comprises:
    a first cavity portion extending from the first aperture section to a shelf of the proximal bracket portion, and
    a second cavity portion extending from the second aperture section to a proximal surface of a pocket that is recessed relative to the shelf; and
a magnet in the pocket and coupled to the proximal bracket portion,
wherein the bracket is configured to receive a ferromagnetic retainer of a fastener in the first cavity portion, and
wherein the magnet is configured to apply a magnetic force to move the ferromagnetic retainer in a direction from the first cavity portion to the second cavity portion, and magnetically couple to the ferromagnetic retainer.

12. The bracket of claim 11, wherein the first aperture section and the second aperture section define a keyhole shape of the aperture.

13. The bracket of claim 11, wherein the first aperture section is defined, at least in part, by a first radius of curvature,
wherein the second aperture section comprises a second radius of curvature, and
wherein the first radius of curvature is greater than the second radius of curvature.

14. The bracket of claim 11, wherein the magnet is coupled to the proximal bracket portion in a proximal section of the pocket, and wherein a distal section of the pocket is configured to receive the ferromagnetic retainer.

15. The bracket of claim 11, wherein the distal bracket portion comprises a flange extending outwardly from the proximal bracket portion.

16. A method of coupling an object to a bracket, wherein the bracket comprises a distal bracket portion and a proximal bracket portion, wherein the distal bracket portion comprises an aperture, wherein the distal bracket portion and the proximal bracket portion define a cavity proximal to the aperture, the method comprising:
inserting, through a first aperture section of the aperture, a fastener to a first position in the cavity of the bracket, wherein the fastener comprises a stem extending from a first end to a second end, wherein the first end is coupled to the object, wherein the fastener comprises a ferromagnetic retainer at the second end of the stem, and wherein the ferromagnetic retainer is in the cavity when the fastener is at the first position, wherein the cavity comprises a first cavity portion and a second cavity portion, wherein the first cavity portion extends from the first aperture section to a shelf at a first depth in the cavity;
after inserting the fastener to the first position, translating the fastener from (i) the first position in which the stem extends through the first aperture section to (ii) a second position in which the stem extends through a second aperture section of the aperture, wherein the second cavity portion extends from the second aperture section to a proximal surface at a second depth in the cavity, wherein the second depth is greater than the first depth such that the second cavity portion comprises a pocket that is recessed relative to the shelf; and
responsive to translating the fastener from the first position to the second position, magnetically coupling the ferromagnetic retainer to a magnet in the cavity of the bracket, wherein the magnet is in the pocket,
wherein the first aperture section has a first width, the second aperture section has a second width, and the ferromagnetic retainer has a third width,
wherein the third width of the ferromagnetic retainer is less than the first width of the first aperture section to allow for inserting the fastener through the first aperture section to the first position, and
wherein the third width of the ferromagnetic retainer is greater than the second width of the second aperture section to inhibit withdrawing the fastener through the second aperture section when the fastener is at the second position.

17. The method of claim 16, wherein translating the fastener from the first position to the second position comprises applying, by the magnet in the cavity of the bracket, a magnetic force on the ferromagnetic retainer to move the fastener in a direction from the first position to the second position.

18. The method of claim 16, further comprising, while the fastener is in the second position, abutting the stem against the distal bracket portion at the second aperture section to support the stem against a force transverse to a longitudinal axis of the stem.

19. The method of claim 16, further comprising:
after magnetically coupling the ferromagnetic retainer to the magnet in the cavity of the bracket, applying a breakaway force to the fastener to decouple the ferromagnetic retainer from the magnet, wherein the breakaway force is greater than a holding strength between the magnet in the cavity and the ferromagnetic retainer;

after applying the breakaway force to the fastener, translating the fastener from the second position to the first position in the cavity; and after translating the fastener to the first position in the cavity, withdrawing the fastener from the cavity through the first aperture section.

20. The method of claim 19, wherein applying the breakaway force to the fastener comprises pulling the fastener distally until the ferromagnetic retainer stops against a proximal ledge of the distal bracket portion.

* * * * *